United States Patent
Lee

(10) Patent No.: US 10,540,028 B2
(45) Date of Patent: Jan. 21, 2020

(54) TOUCH DETECTING APPARATUS AND TOUCH DETECTING METHOD USING PIXEL OR PIXELS IN DISPLAY DEVICES

(71) Applicant: G2TOUCH Co., LTD, Seongnam (KR)

(72) Inventor: Sung Ho Lee, Hwaseong (KR)

(73) Assignee: G2TOUCH CO., LTD., Seongnam (KR)

( * ) Notice: Subject to any disclaimer, the term of this patent is extended or adjusted under 35 U.S.C. 154(b) by 48 days.

(21) Appl. No.: 15/375,025

(22) Filed: Dec. 9, 2016

(65) Prior Publication Data

US 2017/0168624 A1    Jun. 15, 2017

(30) Foreign Application Priority Data

Dec. 15, 2015  (KR) ........................ 10-2015-0179330

(51) Int. Cl.
*G06F 3/044* (2006.01)
*G09G 3/3208* (2016.01)
*G06F 3/041* (2006.01)

(52) U.S. Cl.
CPC ............ *G06F 3/0412* (2013.01); *G06F 3/044* (2013.01); *G06F 3/0416* (2013.01); *G06F 2203/04107* (2013.01); *G09G 3/3208* (2013.01)

(58) Field of Classification Search
CPC ...... G06F 3/0412; G06F 3/044; G06F 3/0416; G06F 3/147; G06F 2203/04107; G09G 3/3648; G09G 3/3688; G09G 3/3208
See application file for complete search history.

(56) References Cited

U.S. PATENT DOCUMENTS

| 2007/0063990 | A1* | 3/2007 | Park | G06F 3/044 345/173 |
| 2007/0285365 | A1* | 12/2007 | Lee | G06F 3/0412 345/87 |
| 2008/0309627 | A1* | 12/2008 | Hotelling | G02F 1/134363 345/173 |
| 2010/0110040 | A1* | 5/2010 | Kim | G06F 3/0412 345/174 |
| 2012/0105337 | A1* | 5/2012 | Jun | G06F 3/0412 345/173 |
| 2014/0062941 | A1* | 3/2014 | Park | G06F 3/0412 345/174 |
| 2014/0225858 | A1* | 8/2014 | Jo | G06F 3/044 345/174 |
| 2014/0285462 | A1* | 9/2014 | Lee | G09G 3/3648 345/173 |

(Continued)

*Primary Examiner* — Jennifer Mehmood
*Assistant Examiner* — James S Nokham

(57) ABSTRACT

Disclosed herein are a touch detecting apparatus and a touch detecting method using a pixel or pixels in display devices including a means for applying an AC input voltage to a drive IC of the display device and detecting a change in touch capacitance between the pixel and an object in synchronization with a change in amplitude of the AC input voltage. In particular, the touch detecting apparatus using a pixel or pixels in display devices according to an exemplary embodiment of the present invention includes: a grayscale voltage generator applying a grayscale voltage to a source line and a sensing signal processor detecting a touch signal based on a feedback voltage of the grayscale voltage applied to the source line.

22 Claims, 17 Drawing Sheets

(56) References Cited

U.S. PATENT DOCUMENTS

| | | | |
|---|---|---|---|
| 2015/0070323 A1* | 3/2015 | Hong | G06F 3/147 345/175 |
| 2015/0212643 A1* | 7/2015 | Lee | G06F 3/0416 345/174 |
| 2015/0356932 A1* | 12/2015 | Kim | G09G 3/3688 345/690 |
| 2016/0202829 A1* | 7/2016 | Choi | G06F 3/044 345/174 |

* cited by examiner

[FIG. 1]
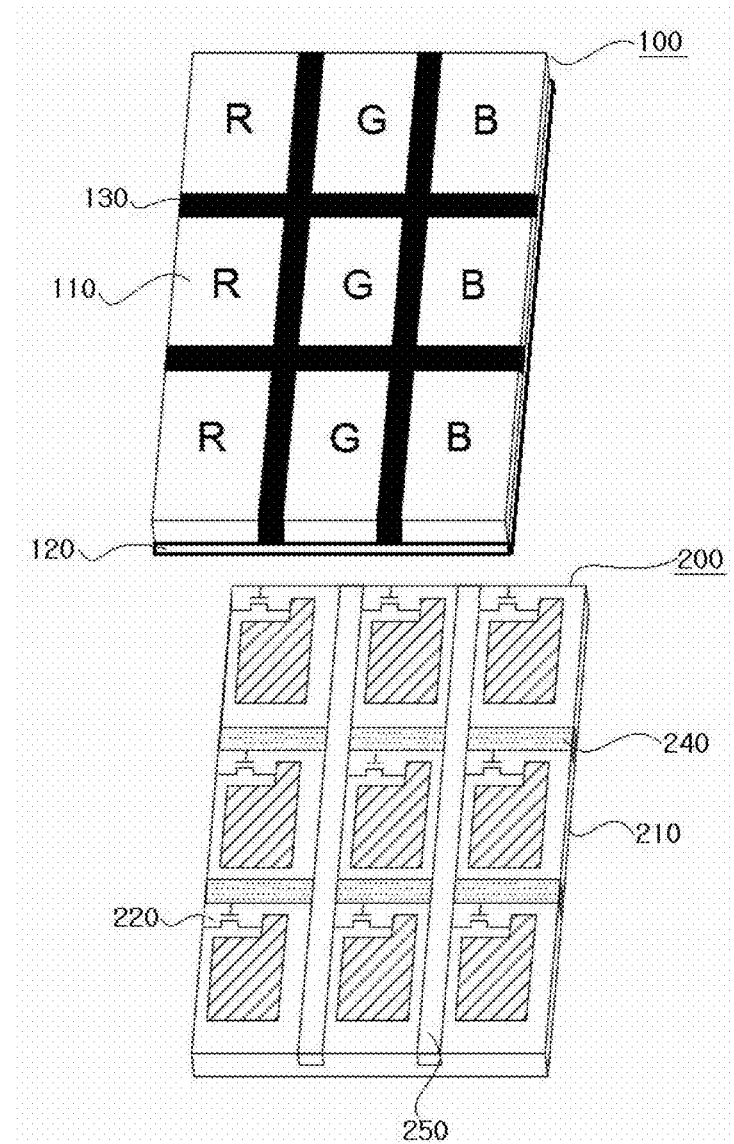

[FIG. 2]
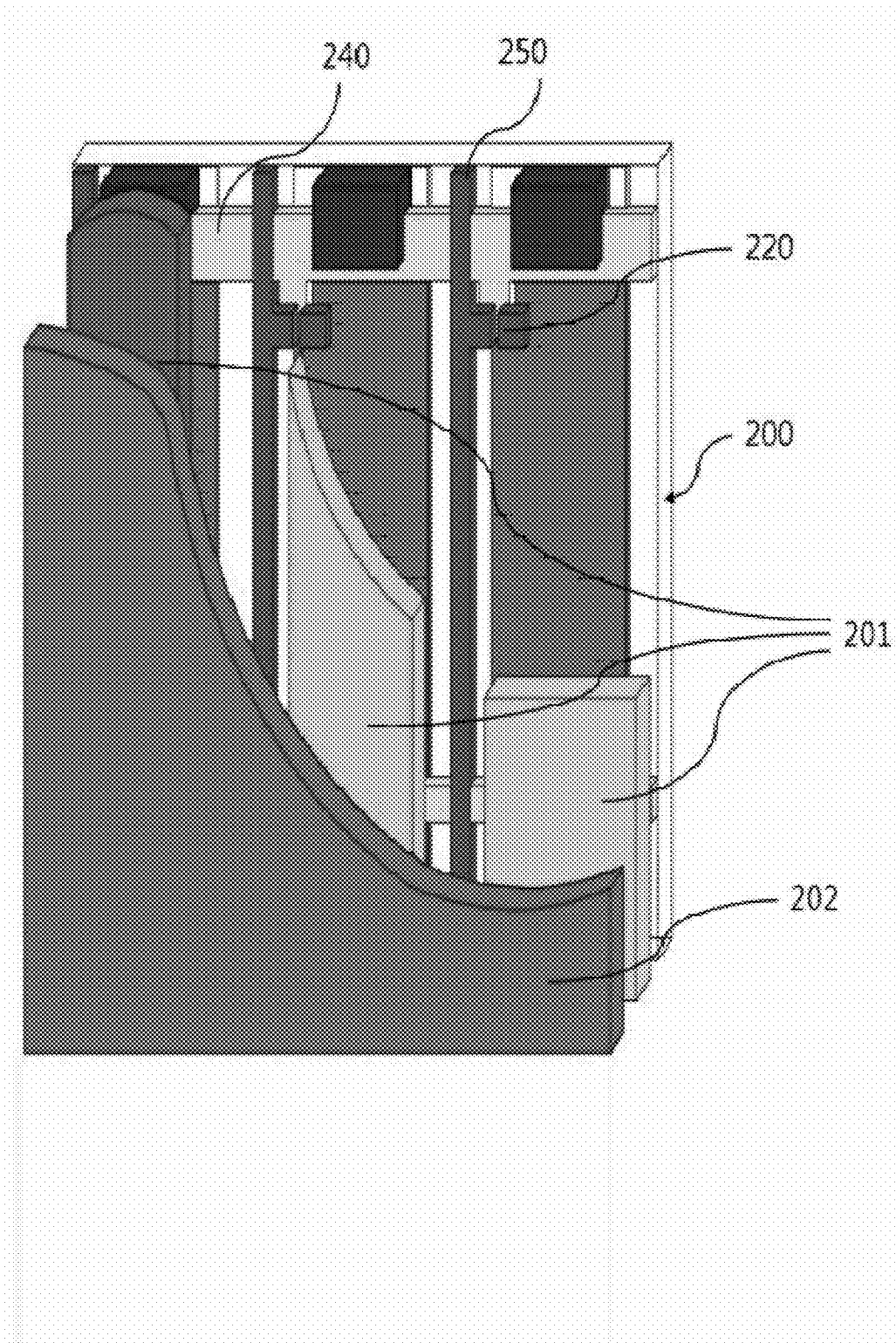

[FIG. 3]
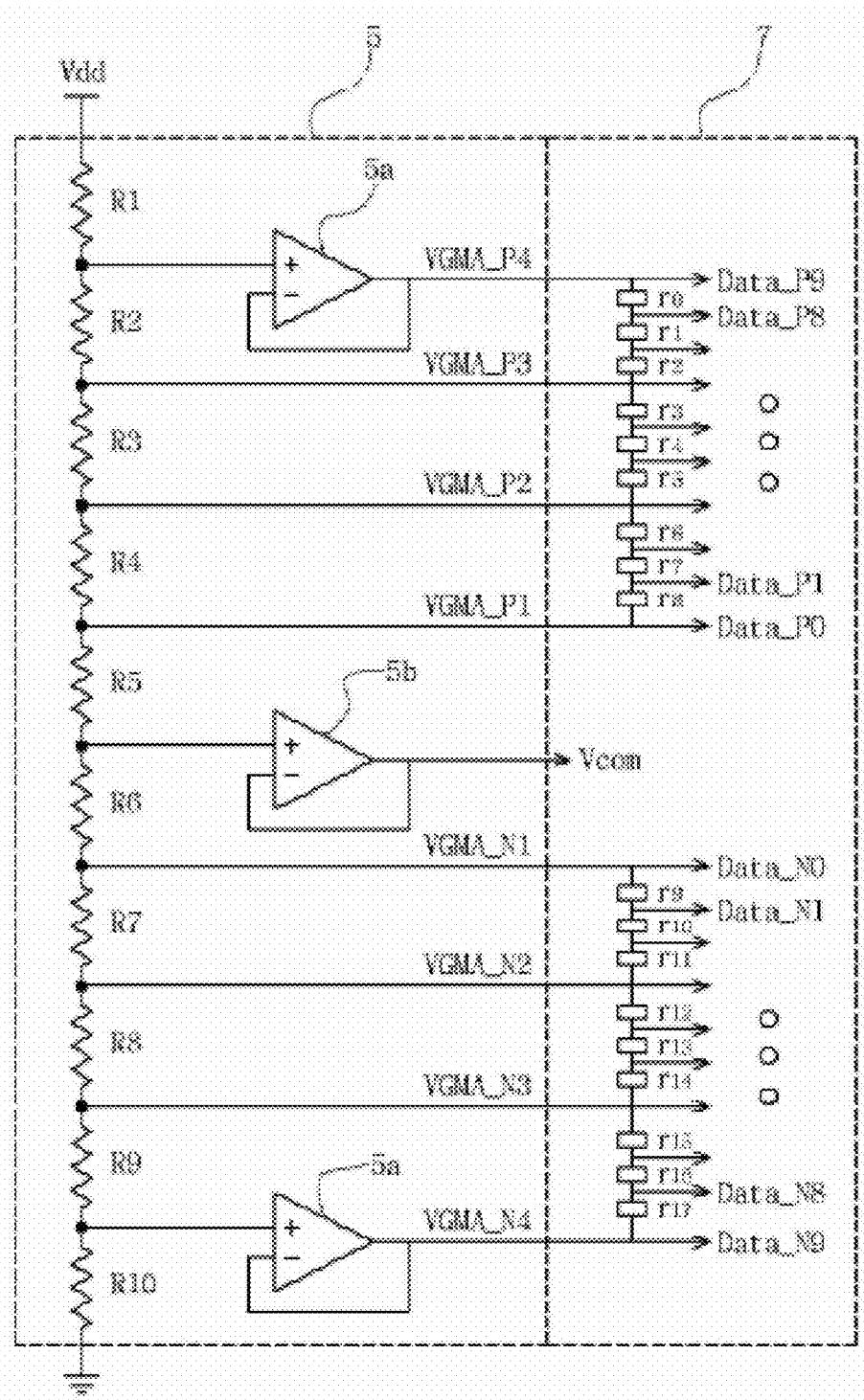

[FIG. 4]
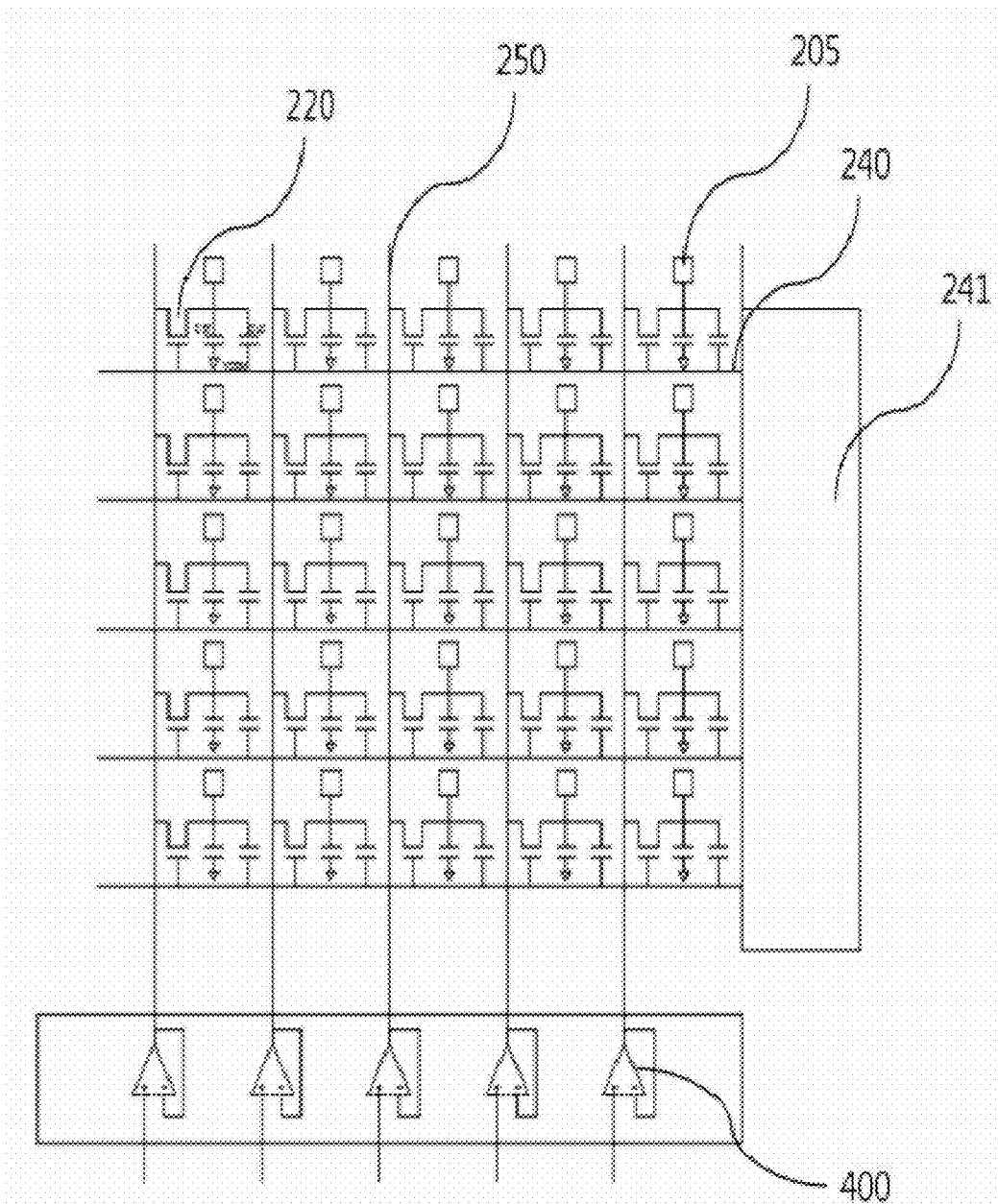

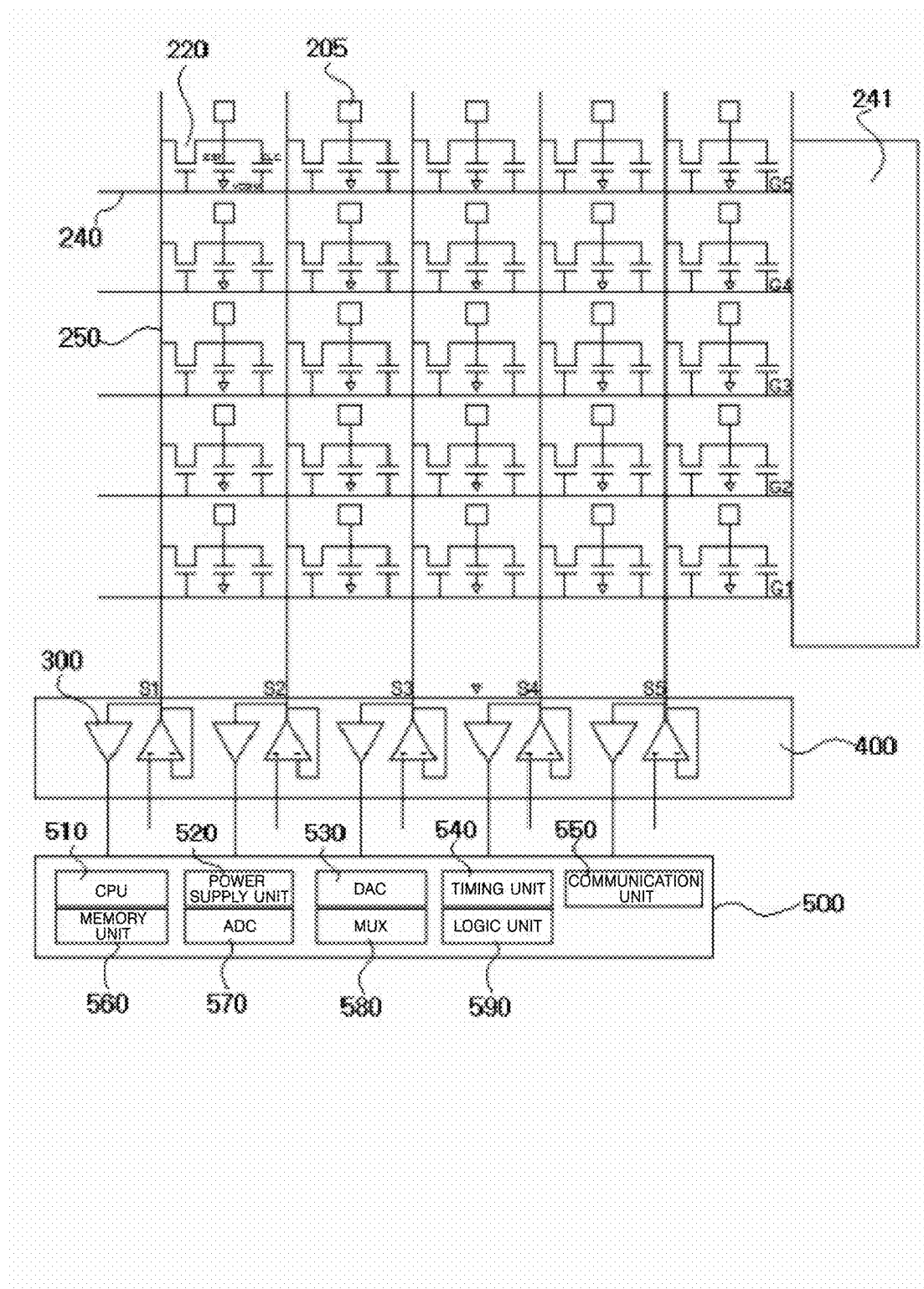
[FIG. 5]

[FIG. 6]
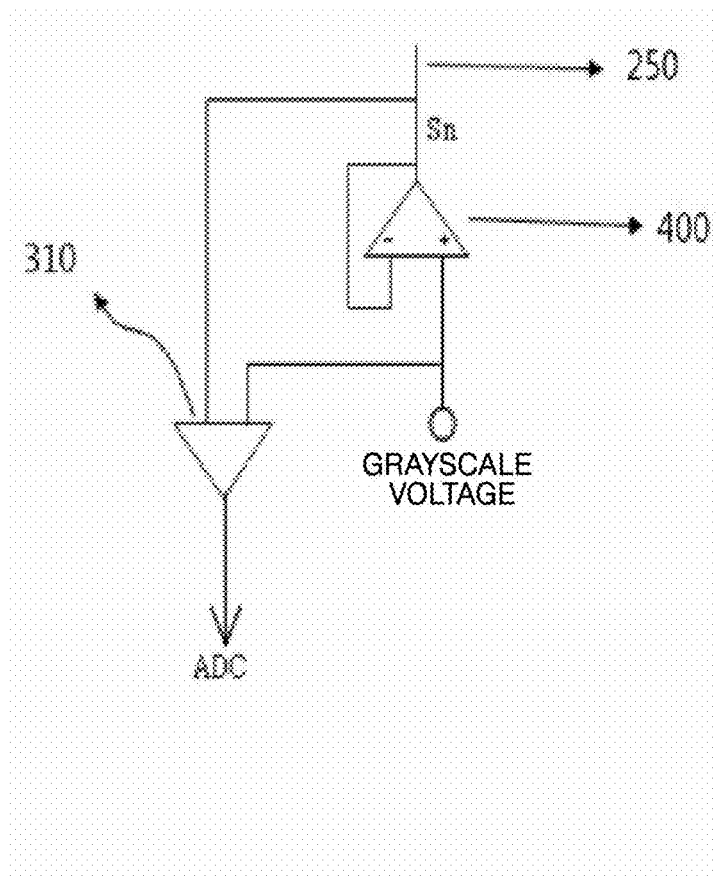

[FIG. 7]
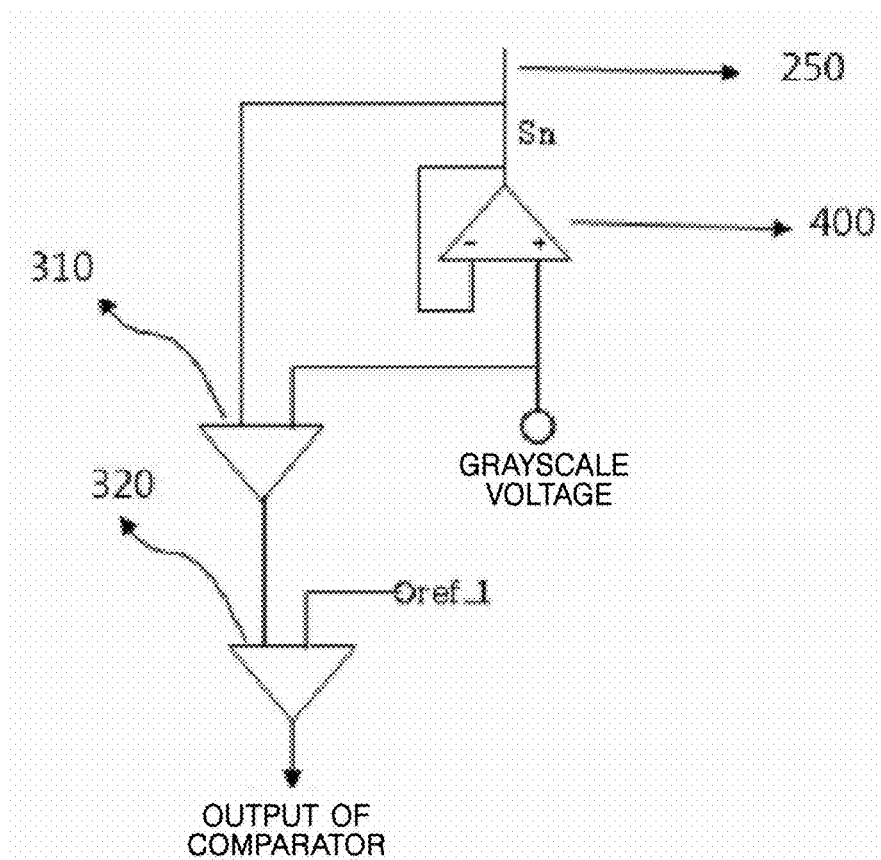

[FIG. 8]
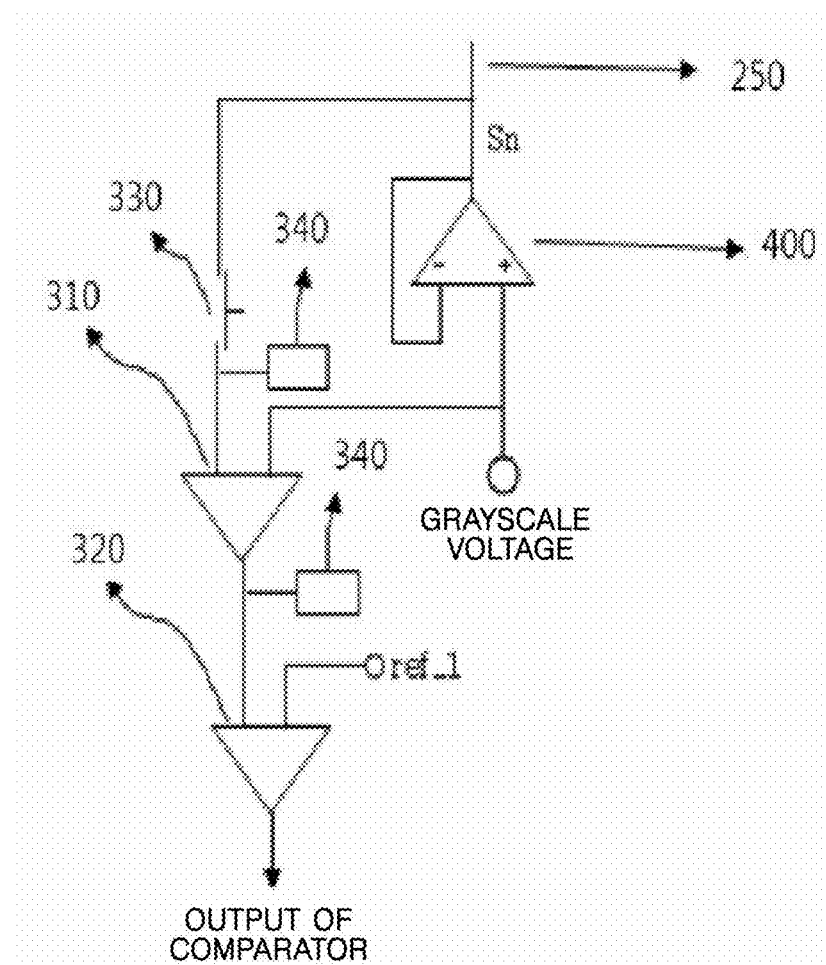

[FIG. 9]
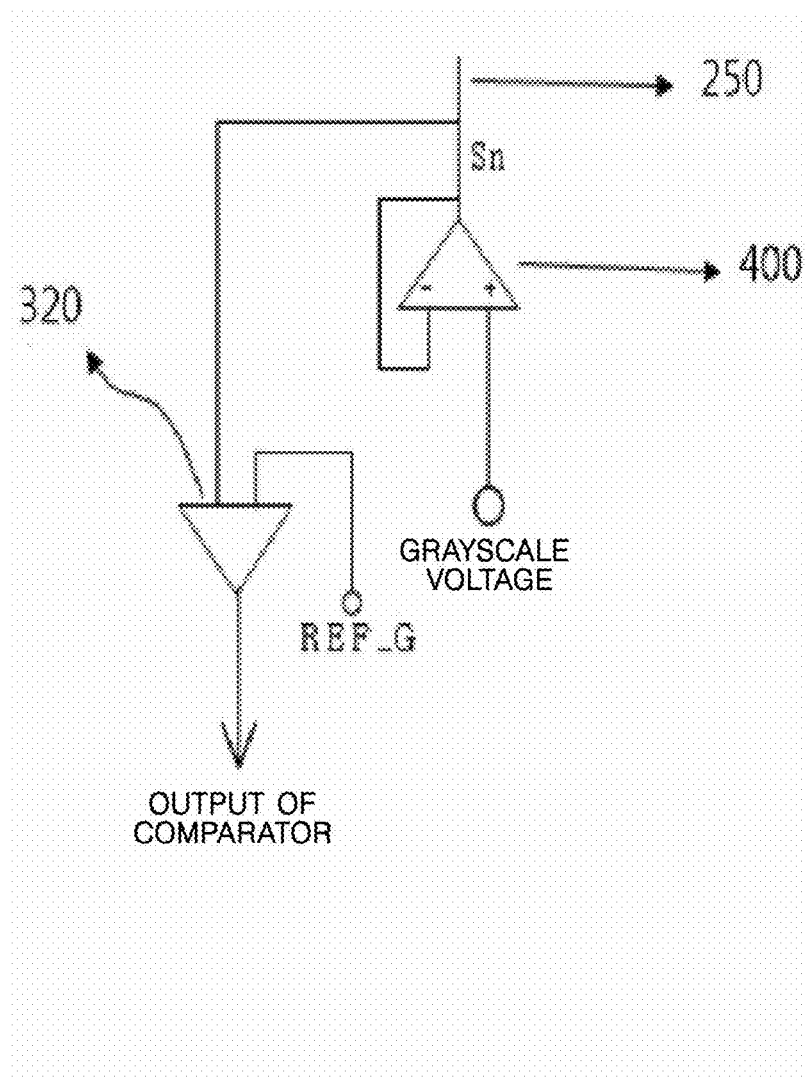

[FIG. 10]
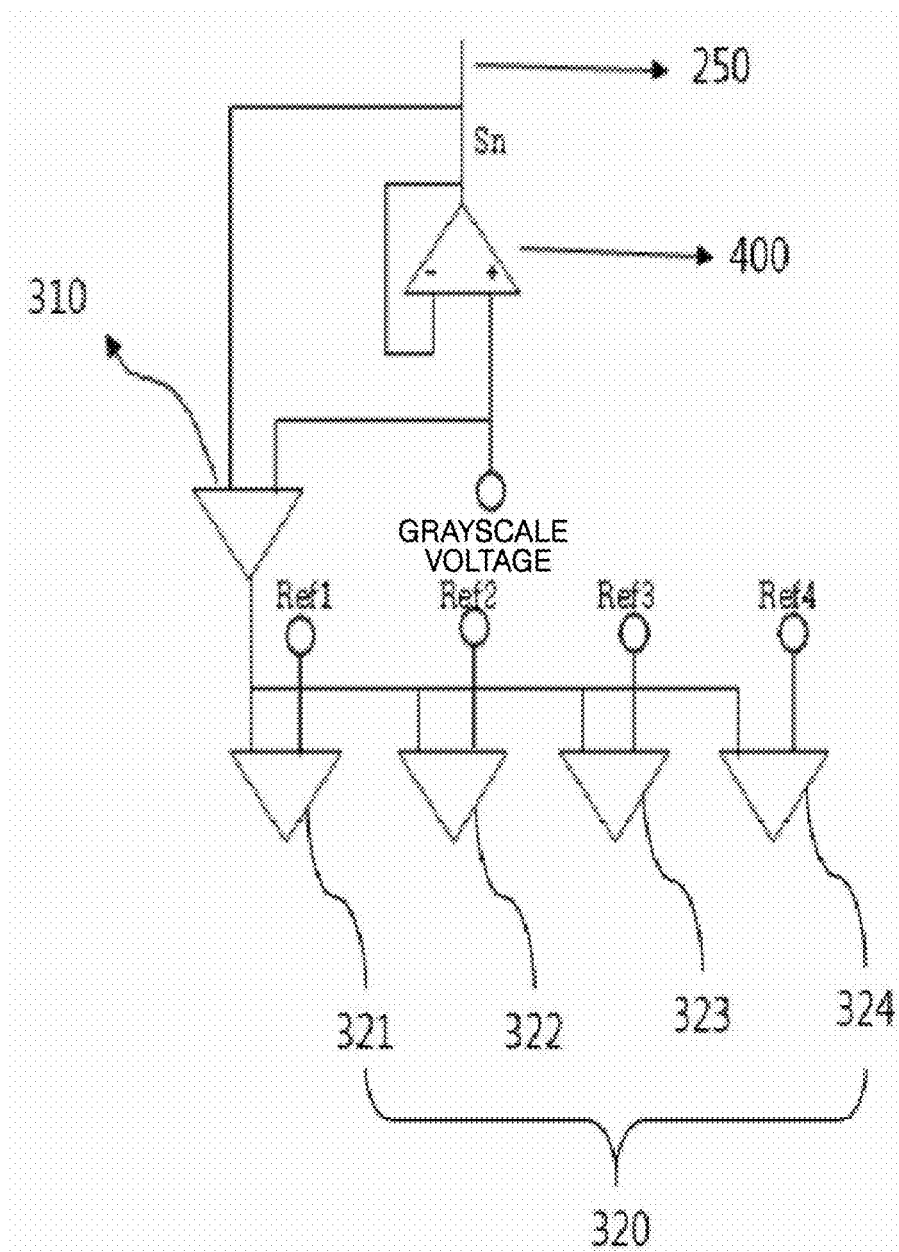

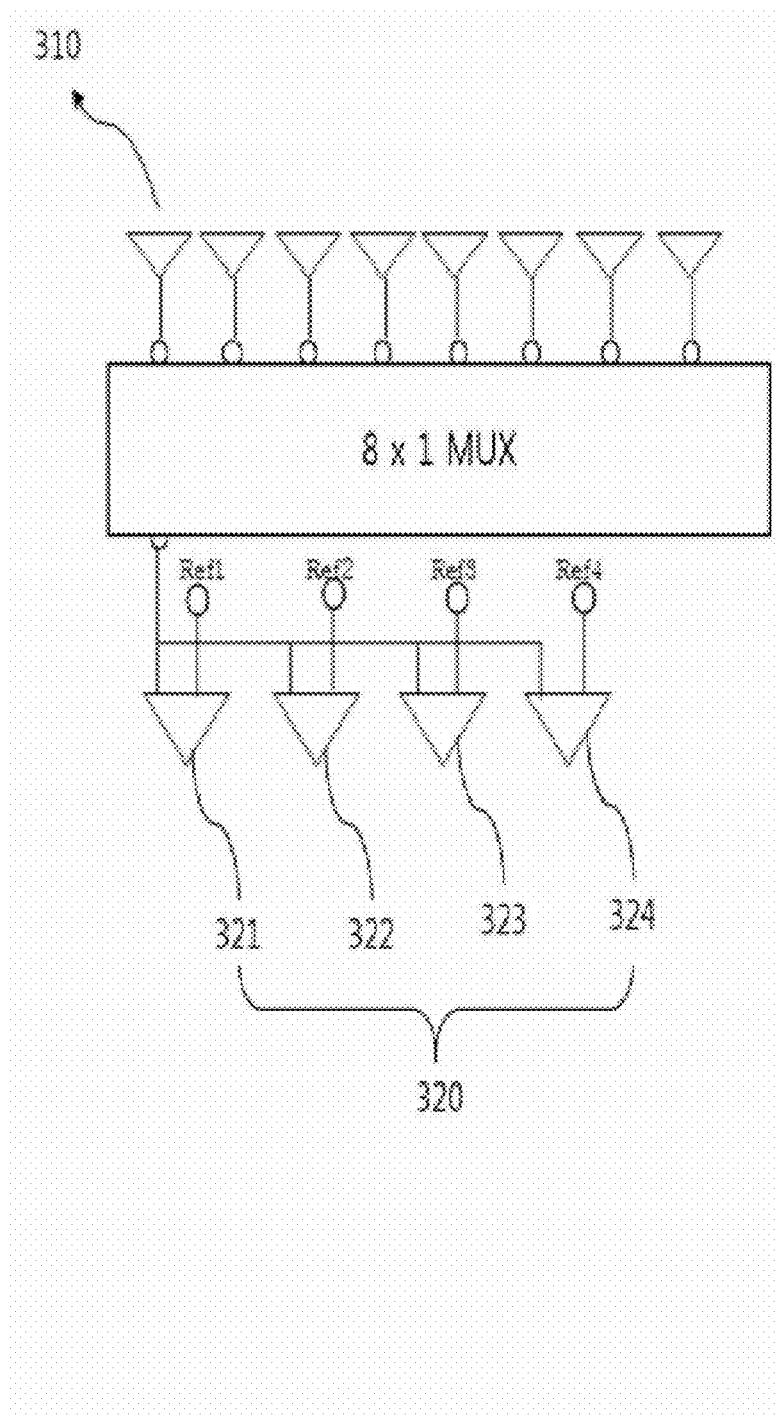
[FIG. 11]

[FIG. 12]
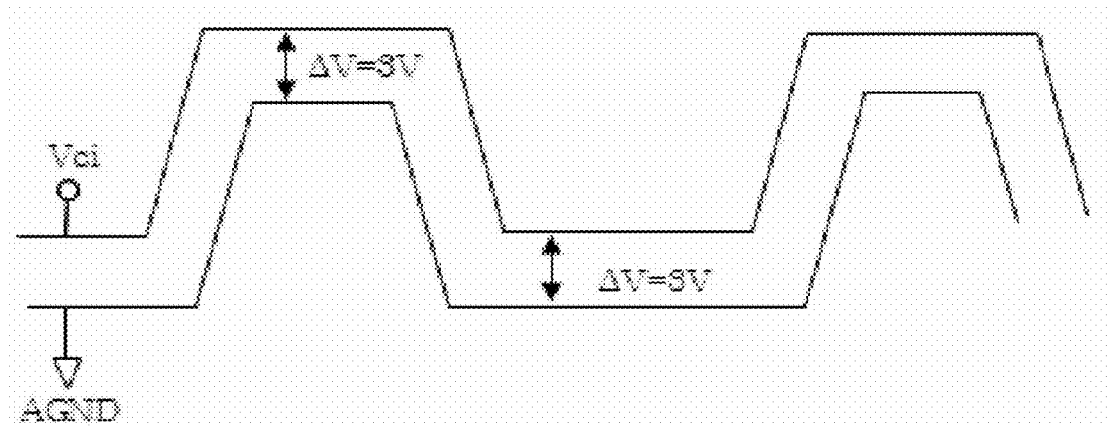
[FIG. 13]
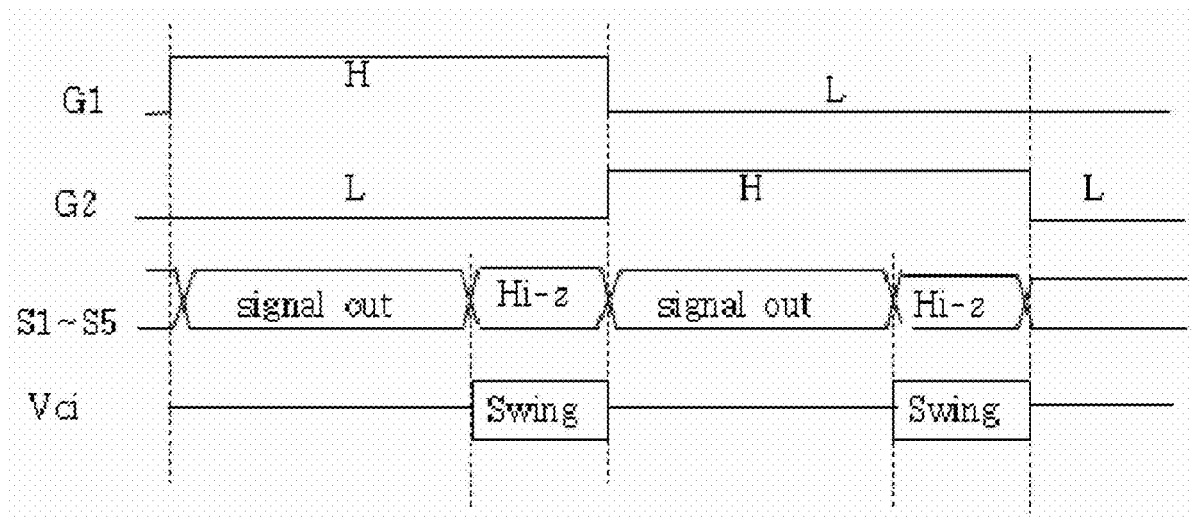

[FIG. 14]
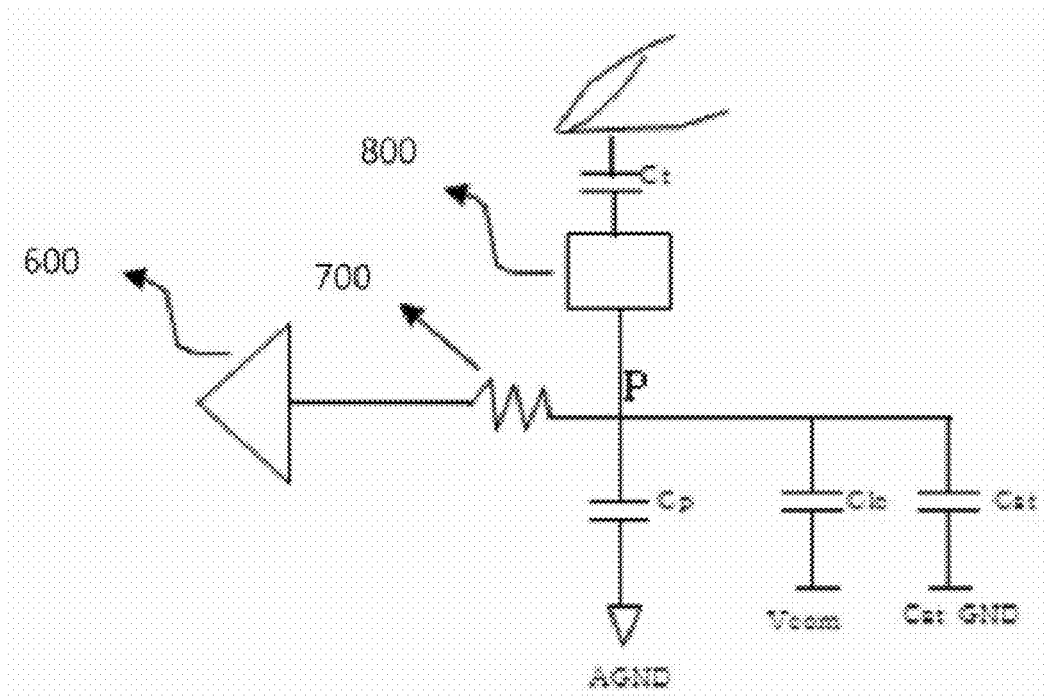

[FIG. 15]
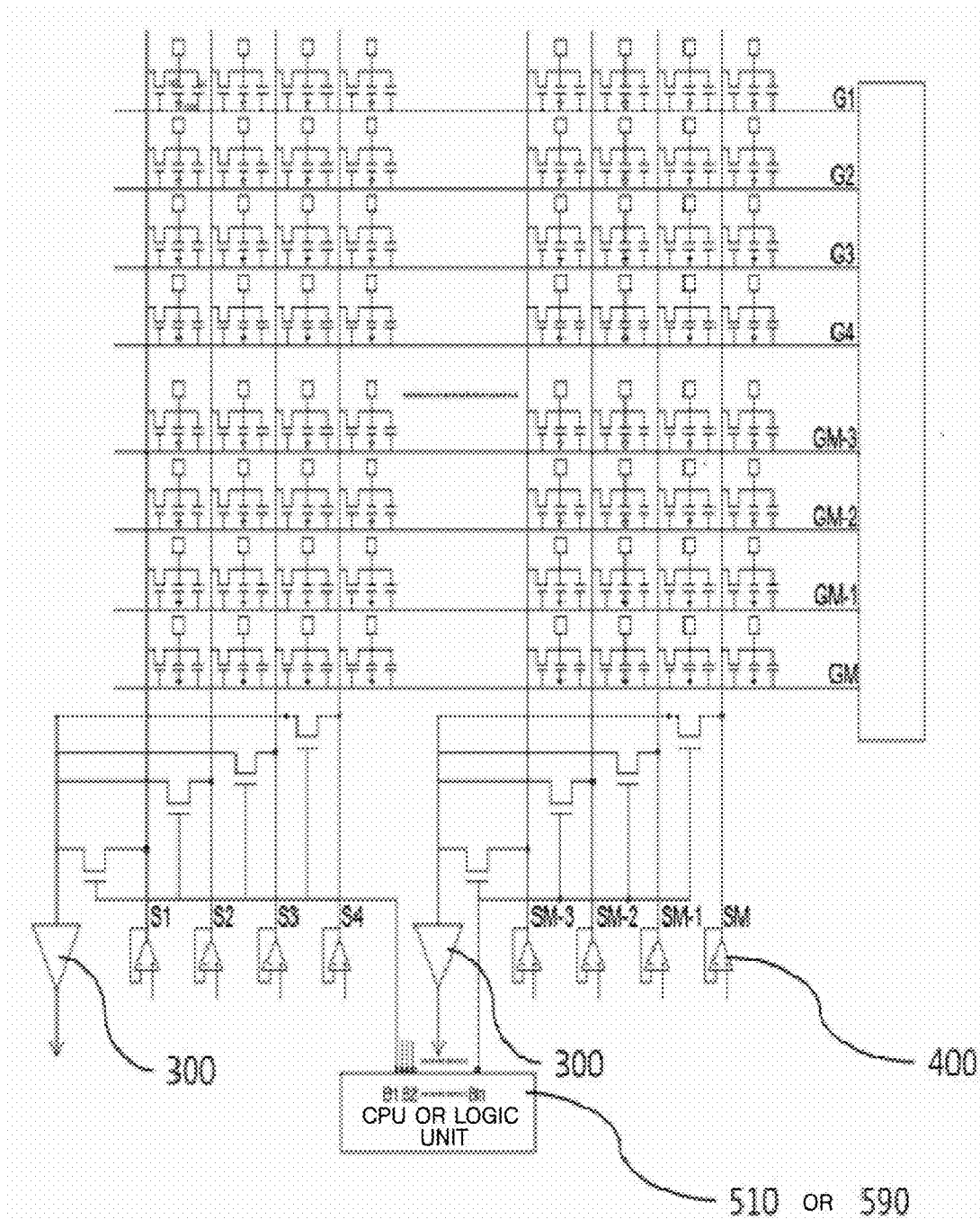

[FIG. 16]
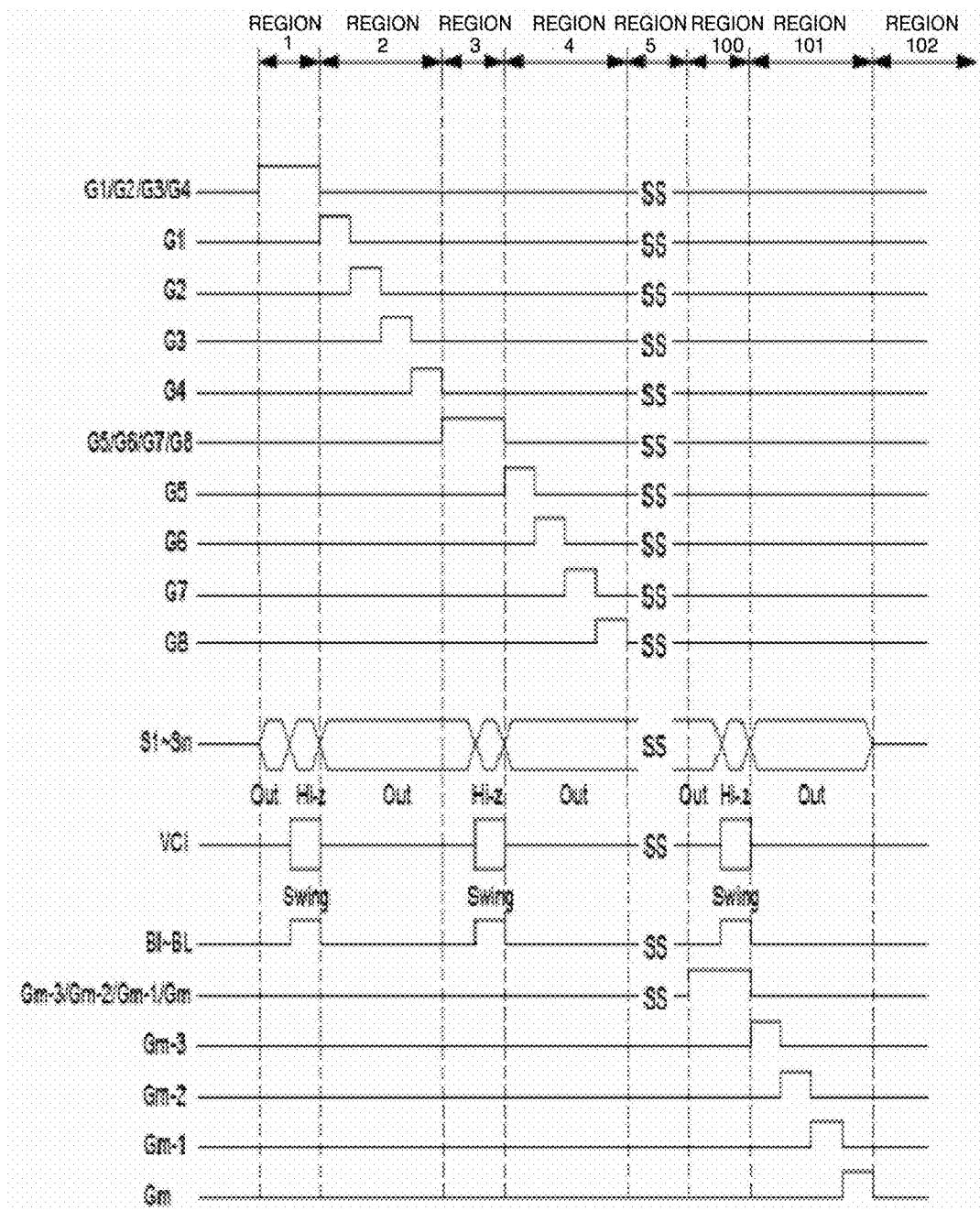

[FIG. 17]
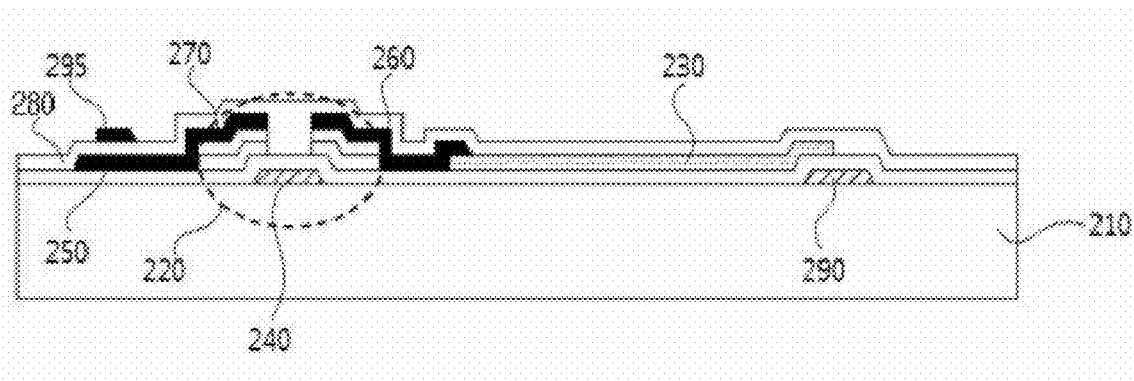
[FIG. 18]
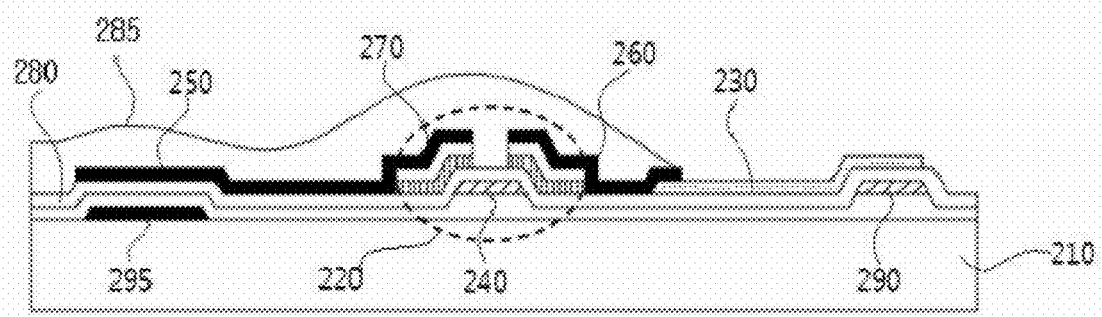

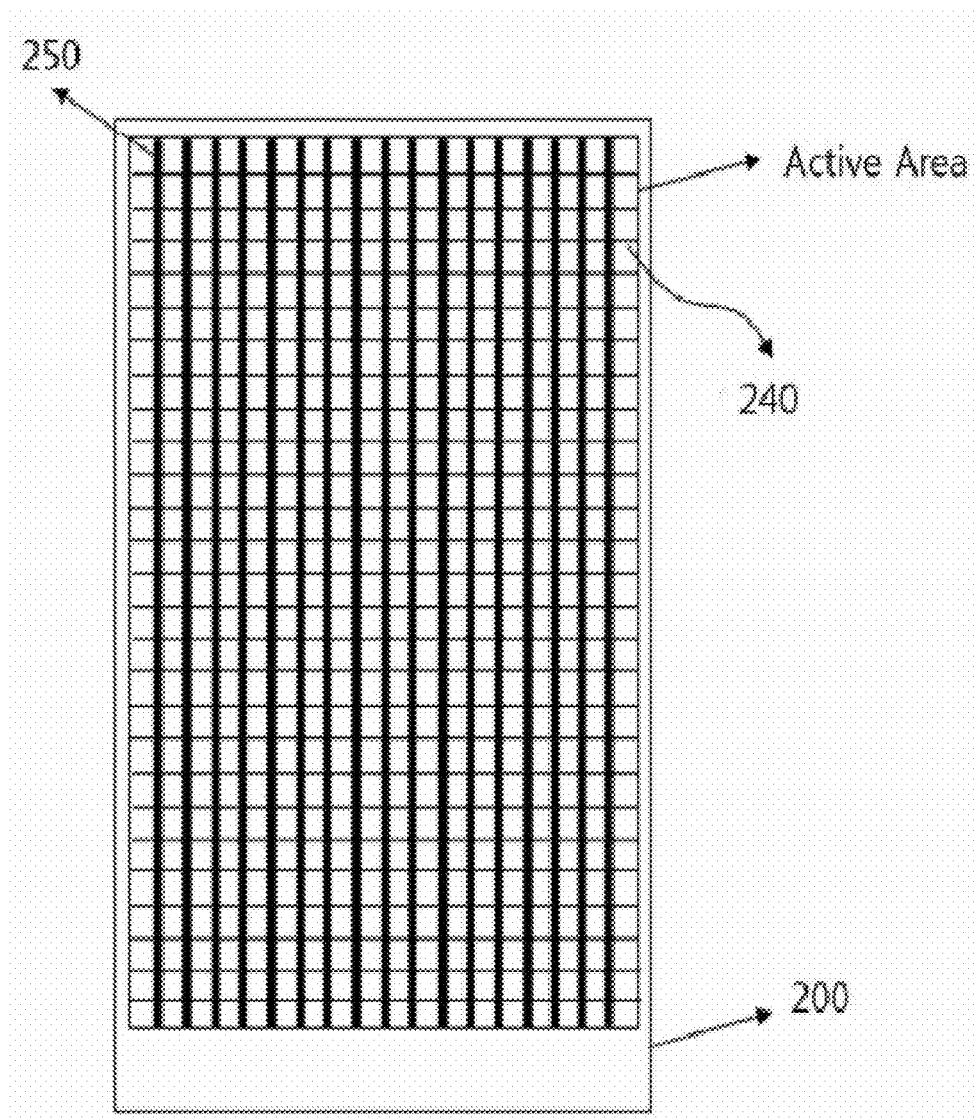
[FIG. 19]

TOUCH DETECTING APPARATUS AND TOUCH DETECTING METHOD USING PIXEL OR PIXELS IN DISPLAY DEVICES

CROSS-REFERENCE TO RELATED APPLICATIONS

This application claims priority from and the benefit of Korean Patent Application No. 10-2015-0179330, filed on Dec. 15, 2015, which is hereby incorporated by reference for all purposes as if fully set forth herein.

BACKGROUND OF THE INVENTION

Field of the Invention

The present invention relates to a touch detecting apparatus and a touch detecting method using a pixel or pixels in display devices.

Discussion of the Background

Generally, a touch screen is an input device that is added on display devices such as a liquid crystal display (LCD), a plasma display panel (PDP), an organic light emitting diode (OLED), and an active matrix organic light emitting diode (AMOLED) or designed to be embedded in the display devices and is a device that recognizes objects such as a finger and a touch pen as an input signal when the objects contact the screen. In recent years, a touch input device has been mostly mounted in mobile devices such as a mobile phone and personal digital assistants (PDA). In addition, the touch input device has been used for the whole industrial fields such as, navigation, a netbook, a notebook, a digital information device, a desk top computer using a touch input support operating system, an internet protocol TV (IPTV), a cutting edge fighter, a tank, and an armored car.

The touch screen used for the foregoing display device, or the like may be divided into an add-on type touch screen, an on-cell type or in-cell type touch screen depending on a structure thereof. The add-on type touch screen is a type that adds individually manufactured touch screens on an upper plate of a display device and has a problem in that since a manufacturing subject of the display device and a manufacturing subject of the add-on type touch screen are different, a distribution is complicated and thus quality is low and costs rise.

On the other hand, the on-cell type or in-cell type touch screen is a type of manufacturing a touch screen simultaneously with manufacturing a display device and there are an on-cell type touch screen in which a touch screen is installed outside a display device such as a color filter of a display device and a TFT substrate and the in-cell type touch screen in which a touch screen is embedded in a display device.

The on-cell type or in-cell type touch screen may improve durability and be slimmed during a manufacturing process and therefore may solve problems that occur in the add-on type touch screen in which the touch screen is added on the upper plate of the display device.

However, to manufacture the on-cell or in-cell type touch screen, a touch sensor detecting a touch signal needs to be separately manufactured on an outer side or an inner layer of the display device, and therefore there is a problem in that productivity is reduced at the time of manufacturing the on-cell or in-cell type touch screen by additionally progressing facility investment or using the existing facilities in the existing display device manufacturers.

SUMMARY OF THE INVENTION

An object of the present invention is to provide a touch detecting apparatus capable of detecting a touch using a pixel or pixels that is manufactured by manufacturing facilities of the display device and a touch detecting method.

As described above, a characteristic configuration of present invention is as follows for achieving the above objects of the present invention and specific effects of the present invention.

According to an exemplary embodiment of the present invention, a touch detecting apparatus using a pixel or pixels in display devices is provided, the apparatus comprising: a grayscale voltage generator generating a first grayscale voltage applied to the pixel or the pixels in the display devices; and a sensing signal processor detecting a touch signal based on the first grayscale voltage applied to the pixel or the pixels and a second grayscale voltage fed back from the pixel or the pixels.

The sensing signal processor calculates a difference value between the first grayscale voltage and the second grayscale voltage to detect the touch signal.

The sensing signal processor includes a differential amplifier that calculates and amplifies a difference value between the first grayscale voltage and the second grayscale voltage.

An input terminal of the differential amplifier is provided with a circuit element temporarily storing the second grayscale voltage.

The sensing signal processor calculates a difference value between the first grayscale voltage and the second grayscale voltage and compares the difference value with a preset reference value to detect the touch signal.

The sensing signal processor includes: a differential amplifier calculating and amplifying a difference value between the first grayscale voltage and the second grayscale voltage; and a comparator comparing the difference value with a preset reference value.

An input terminal of the differential amplifier is provided with a circuit element temporarily storing the second grayscale voltage, or an input terminal of the comparator is provided with a circuit element temporarily storing the difference value.

The sensing signal processor includes: a differential amplifier calculating and amplifying a difference value between the first grayscale voltage and the second grayscale voltage; and a plurality of comparators comparing the difference value with a plurality of preset reference values.

The sensing signal processor includes: a plurality of differential amplifiers calculating and amplifying a difference value between the first grayscale voltage and the second grayscale voltage; a mux selecting one of a plurality of difference values output through the plurality of differential amplifiers; and a plurality of comparators comparing the selected one difference value with a plurality of preset reference values.

The touch detecting apparatus further comprising: a CPU performing a fingerprint recognition operation based on the detected touch signal.

The touch detecting apparatus further comprising: a CPU or a logic grouping at least two pixels present on the display devices and simultaneously controlling them to increase a touch capacitance of the touch signal.

According to another exemplary embodiment of the present invention, touch detecting method using a pixel or pixels in display devices is provided, the method comprising: generating a first grayscale voltage applied to the pixel or the pixels in the display devices; and detecting a touch signal based on the first grayscale voltage applied to the pixel or the pixels and a second grayscale voltage fed back from the pixel or the pixels.

In the detecting, a difference value between the first grayscale voltage and the second grayscale voltage is calculated to detect the touch signal.

The detecting includes calculating and amplifying, by a differential amplifier, a difference value between the first grayscale voltage and the second grayscale voltage.

An input terminal of the differential amplifier is provided with a circuit element temporarily storing the second grayscale voltage.

In the detecting, a difference value between the first grayscale voltage and the second grayscale voltage is calculated and the difference value is compared with a preset reference value to detect the touch signal.

The detecting includes: calculating and amplifying, by a differential amplifier, a difference value between the first grayscale voltage and the second grayscale voltage; and comparing, by a comparator, the difference value with a preset reference value.

An input terminal of the differential amplifier is provided with a circuit element temporarily storing the second grayscale voltage, or an input terminal of the comparator is provided with a circuit element temporarily storing the difference value.

The detecting includes: calculating and amplifying, by a differential amplifier, a difference value between the first grayscale voltage and the second grayscale voltage; and comparing, by a plurality of comparators, the difference value with a plurality of preset reference values.

The detecting includes: calculating and amplifying, by a plurality of differential amplifiers, a difference value between the first grayscale voltage and the second grayscale voltage; selecting, by one mux, one of a plurality of difference values output through the plurality of differential amplifiers, and comparing, by a plurality of comparators, the selected one difference value with a plurality of preset reference values.

The touch detecting method further comprising: recognizing, by a CPU, a fingerprint based on the detected touch signal.

The touch detecting method further comprising: grouping, by a CPU or a logic, at least two pixels present on the display devices and simultaneously controlling them to increase a touch capacitance of the touch signal.

BRIEF DESCRIPTION OF THE DRAWINGS

FIG. 1 is a diagram illustrating an LCD basic structure.

FIG. 2 is a diagram illustrating a structure of AMOLED.

FIG. 3 is a diagram illustrating a configuration of a grayscale generator according to an exemplary embodiment of the present invention.

FIG. 4 is a diagram for describing a driving principle of an LCD that does not include a touch screen.

FIG. 5 is a diagram illustrating an exemplary embodiment of the present invention using a pixel or pixels as a touch detecting apparatus.

FIGS. 6 to 10 are diagrams illustrating a configuration of a sensing signal processor according to an exemplary embodiment of the present invention.

FIG. 11 is a diagram illustrating a concept of recognizing a plurality of amplifier signals using a MUX according to an exemplary embodiment of the present invention.

FIG. 12 is a diagram illustrating an example of an alternating AC voltage.

FIG. 13 is a timing chart of a touch detecting method using a pixel or pixels according to an exemplary embodiment of the present invention.

FIG. 14 is a diagram illustrating a touch detecting concept according to an exemplary embodiment of the present invention.

FIG. 15 is a diagram illustrating a method for forming one touch capacitance by operating a plurality of pixels like one pixel according to an exemplary to embodiment of the present invention.

FIG. 16 is an operation timing diagram of FIG. 15.

FIG. 17 is a cross-sectional view of a structure of TFT of FIGS. 4 and 5.

FIG. 18 is a diagram illustrating an example in which a guard layer is disposed under a source line.

FIG. 19 is a diagram illustrating a guard layer that is added over or under the source line.

DETAILED DESCRIPTION OF THE ILLUSTRATED EMBODIMENTS

Hereinafter, exemplary embodiments of the present invention will be described in detail with reference to the accompanying drawings.

First, the present invention relates to a touch detecting apparatus and a touch detecting method using a pixel or pixels in display devices according to an exemplary embodiment of the present invention. In particular, the present invention relates to a touch detecting apparatus and a touch detecting method for outputting touch coordinates by determining a size of added touch capacitance or whether a touch capacitance is added in synchronization with a rising or falling edge of an AC power source supplied to a touch & display drive IC (TDDI) when the touch capacitance is added by a contact of external objects such as a finger and a pen with a pixel.

The touch detecting apparatus according to the exemplary embodiment of the present invention may use a pixel in a display device, but connect a plurality of pixels to each other and use the connected pixels and detect a difference between a voltage applied to the pixel and a voltage fed back from the pixel to determine whether a touch is generated.

A display device stated in the present invention is any one of a kind of liquid crystal display (LCD), a plasma display panel (PDP), an active matrix organic light emitting diode (AMOLED), and a passive matrix organic light emitting diode (PMOLED), or includes all means displaying any type of still image (such as JPG, TIF, or the like) or moving picture (MPEG-2, MPEG-4, or the like) to users.

According to the present invention, the touch input means (or referred to as object) includes any type of inputs (for example, object like a conductor having a predetermined form or input like an electromagnetic wave, etc.) which leads to a change in voltage which may be sensed by a touch detecting apparatus as well as a finger, an active touch pen, and a passive touch pen.

Components such as "~unit" and "~group" described below are a set of unit function elements performing specific functions. For example, an amplifier for any signal is a unit function element and a set of amplifiers or signal converters may be named a signal conversion unit. Further, the "~unit" or the "~group" may be included in "~units" or "~groups" that are upper-level components or may include "~units" or "~groups" that are lower-level components. Further, the "~unit" or the "~group" itself may include an operation function or an independent central processing unit (CPU) which may process commands, etc., stored in a memory, etc.

In the drawings, to clearly represent layers and regions, a thickness or a region is exaggerated in the drawings for clarity. Like reference numerals designate like elements throughout the specification.

Further, provided that parts such as a layer, an area, and a substrate are present "on" another part or "upper surface", this means that these parts are disposed "just on another part (there is no another part therebetween)" and these parts have another part (for example, medium layer or insulating layer) disposed therebetween.

Further, a "signal" described in the present specification is the generic term for a voltage or a current unless specially indicated.

Further, in the present specification, "capacitance" represents a physical magnitude. Meanwhile, a "capacitor" is referred to as an element having a capacitance which represents a physical magnitude.

In the present specification, sign C used as a sign of a capacitor is used as a sign representing a capacitor and represents a capacitance which is a magnitude of the capacitor. For example, C1 is not only a sign indicating a capacitor, but also indicates capacitance of the capacitor.

Further, in the present specification, a minimum unit of a display device that displays red, green, or blue is named a pixel (picture element) and a set of three pixels of RGB is defined as dot.

As a representative display device, there are an LCD and an OLED. Among those, as the OLED, an AMOLED has been mainly used recently. FIG. 1 is a diagram illustrating a basic structure of an LCD. Referring to FIG. 1, a color filter substrate 100 has a BM 130 and a common electrode 120 formed thereon, in which the BM 130 is between resins displaying red/green/blue 110 and the common electrode 120 is a transparent electrode such as ITO which is a conductive transparent material and is applied with a common voltage (not illustrated) to drive a liquid crystal with a voltage of an anode of a TFT substrate.

Meanwhile, a lower substrate is a TFT substrate 200 and has longitudinal source lines 250 applying a pixel voltage to an anode, transversal gate lines 240 turning on/off a gate voltage of a TFT, and a TFT 220 disposed thereon.

The source line 250 and the gate line 240 are connected to an LCD drive IC (LDI) to drive the LCD using a time sharing method by an operation of a time controller (ICON) that is embedded in or separated from the LDI. In this case, the gate line 240 is operated by a gate in panel (GIP) 241 that is operated by the TFT formed inside an LCD substrate. In this case, the LDI serves to supply a clock required in the GIP.

As the OLED, the AMOLED has been mainly used recently and FIG. 2 illustrates the AMOLED. Referring to FIG. 2, the longitudinal source line 250 that applies the pixel voltage to the anode, the transversal gate line 240 that turns on/off the gate voltage of the TFT, and the TFT 220 are disposed on the substrate.

In the display device of the AMOLED, the pixel voltage applied to the source line 250 is applied to the anode through the TFT 220 and the anode injects holes into an organic emitter between the anode and a cathode that is the common electrode and the cathode injects electrons into the organic emitter to combine the holes with the electrons in an organic matter, thereby emitting light and dividing red/green/blue depending on wavelength range of the organic emitter.

Reviewing FIGS. 1 and 2, the structure of the TFT substrate is the same but there is a difference in a driving method in that the LCD is based on a voltage driving scheme and the OLED is based on a current driving scheme.

For convenience, the present invention describes the LCD as an example but all the technical ideas are identically applied to the OLED and the LCD and the OLED are collectively called the display device. Further, a kind of display devices is not limited to the LCD and the OLED and all the display devices including pixels connected to the TFT operated by the driving of the source line and the gate line are included in the category of the display device described in the present invention.

Referring back to FIG. 1, the structure of the LCD in which the common electrode is disposed on the color filter substrate 100 is a TN type and in IPS, FFS, etc., that are an in plane switching mode, the common electrode need not be disposed on the color filter substrate as illustrated in FIG. 1.

When a pixel in a display device of the present invention uses the pixel as a touch sensor, if the common electrode is disposed on the pixel, a potential of the common electrode hinders a formation of touch capacitance Ct between the pixel and an object and thus the touch capacitance Ct does not occur. Therefore, the TN type LCD has a structure in which the TFT substrate rises up and the color filter is disposed at a lower portion to rule out an effect due to the common electrode, thereby performing the touch detection. On the other hand, in the LCD of the in plane switching mode, the color filter does not have the common electrode, and therefore the touch sensor using the pixel of the present invention is operated well without taking any action on the LCD.

FIG. 3 illustrates a grayscale generator that generates a voltage applied to a pixel of the LCD, a grayscale amplifier, or a grayscale voltage generator 5 (hereinafter, referred to as "grayscale generator 5").

The pixel displaying three colors such as red/green/blue is collected to form a dot and a touch & display drive IC (TDDI) including the LCD receives image data by pixel from the outside. The image data include each data for R/G/B and the image data of 16 bits, 18 bits, 24 bits, or the like are transferred to the TDDI. In the case of the image data of 16 bits, signals of 6 bits for red, 6 bits for green, and 4 bits for blue are generally used and in the case of the image data of 18 bits, 6 bits for red, 6 bits for green, 6 bits for blue by pixel are each used. Further, in the case of the image data of 24 bits, the image data of 8 bits by pixel are used, and therefore R+G+B forms 24 bits.

If the image data of 24 bits are used, the R/G/B each have the image data distribution of $2^8$ and three pixel colors displayed in the pixel have a distribution of $2^{24}$, such that one dot has a color distribution of 16.7 Mega. Further, each of the pixels displaying R/G/B has a color distribution of $2^8$. Displaying a color of ($2^8=$) 256 step is "grayscaler" or "grayscale" and the grayscale generator 5 of FIG. 3 is an apparatus for generating a grayscale voltage m corresponding to a video signal input from the outside to the TDDI.

FIG. 3 illustrates the grayscale generator 5 of an LCD mode performing a dot inversion and there are a grayscale voltage (or the term "grayscale" is also used as the same meaning) having plus polarity and a grayscale voltage having minus polarity having a common voltage therebetween. The grayscale generator 5 is present for each red/green/blue and the grayscale voltage having plus polarity and the grayscale voltage having minus polarity are each present for one color. In this case, the grayscale generator 5 will be 6.

FIG. 3 briefly illustrates the grayscale generator 5. If data of 8 bits are used, there will be 256 plus grayscales and 256 minus grayscales. In FIG. 3, the plus grayscale is 10 (P0 to P9) and the minus grayscale also is 10 (N0 to N9).

The grayscale voltage generator 5 of FIG. 3 will be further described below. The grayscale voltage generator 5 is applied with a reference voltage (Vdd and ground installed at the opposite side thereto) generated from the voltage generator to be described below. As the ground voltage, a DC voltage other than 0 V may also be applied. A grayscale voltage generated from a one-stage gamma voltage generator is buffered by a gamma buffer 5*a* and then is transferred to a two-stage resistance string unit 7 to be subdivided.

The resistance string unit 7 generates a grayscale voltage matching a depth of the video signal. For example, if a depth of red video signal is 8 bits, a grayscale voltage of 256 steps is generated.

In the dot inversion, a plus region (positive region) and a minus region (negative region) are divided based on a common voltage Vcom located at a central portion of the gamma voltage generator 5. The plus region is defined as a positive region where the grayscale voltage is larger than the common voltage, and the minus region is defined as a negative region where the grayscale voltage is smaller than the common voltage.

If the video signal transferred from the outside of the TDDI to the TDDI is applied by 8 bits as red (R), green (G), and blue (B), the grayscale voltage generator 5 selects a grayscale voltage corresponding thereto. For example, if the red video data transferred as 8 bits indicates a 10-th grayscale voltage, in FIG. 3, Data_P9 is selected and in the case of the dot inversion, plus data and minus data are selected in sequence, and therefore the Data_P9 is selected in sequence by the same video data. Further, if the video data is 244, although not illustrated in FIG. 3, a 224-th grayscale voltage will be selected.

The voltage selected by the grayscale unit is applied to each source line through a source driver and the voltage applied to the source line is transferred to only a TFT in a turned on state and transferred to a pixel, a storage capacitor Cst, and a liquid crystal capacitor Clc, by a turn on voltage of a TFT on an activated gate line.

The grayscale voltage applied to the pixel adjusts a light quantity of a liquid crystal depending on a voltage difference from a common voltage adjacent to the upper side or the left or right sides of the pixel, thereby displaying grayscales by color.

FIG. 4 is a diagram for describing a driving principle of an LCD that does not include a touch screen. Referring to FIG. 4, the longitudinal source line 250 is connected to a source drive 400 and connected to sources of all the longitudinal TFTs and the gate line 240 is connected to a gate of the TFT. As the source drive 400 connected to the source line 250, a buffer using OPAMP may be used. Since the buffer serves to output the input grayscale voltage to the source line, the input grayscale voltage is transferred to the pixel well without a time delay and driving capability considering a parasitic capacitor connected to the source line 250, a resistance of the line, or the like is important.

According to the exemplary embodiment of the present invention, to detect a touch signal using a pixel, the source drive 400 requires a separate function of keeping a high impedance (hereinafter, Hi-z) state. Therefore, according to the exemplary embodiment of the present invention, the source drive 400 transferring the grayscale voltage to the source line 250 requires an out state and the Hi-z state that are two states.

The gate line 240 is sourced from a gate group including a gate IC (not illustrated) or a gate in panel (GIP) 241 to be connected to the gates of all the lateral TFTs. When a large number of pixels are present, gate blocks are present at each of the left and right of the display device and TFTs of even rows and odd rows are separately driven or the TFTs of the left and right of the screen are separately driven. According to the exemplary embodiment of the present invention, even though the gate block is individually positioned at the left and right of the display device, as illustrated in FIG. 4, provided that the gate block is formed in one block.

FIG. 5 is a diagram illustrating an exemplary embodiment of the present invention using a pixel or pixels as a touch detecting apparatus. Referring to FIG. 5, a source drive output signal in the source drive 400 is input to a sensing signal processor 300. The sensing signal processor 300 is used to detect a voltage level of the source line.

The sensing signal processor 300 is installed inside the TDDI like the source drive 400. Alternatively, the display device according to the exemplary embodiment of the present invention may be operated using the TFT that is installed at one side of the display device and included in the display device as a basic element.

The sensing signal processor 300 includes an amplifier, a comparator, a buffer, a grayscale voltage connector, a reference voltage connector, etc. Further, for the sensing signal processor 300 to perform signal processing, several function blocks 500 are added to the TDDI. The function block 500 includes a CPU 510, a power supply unit 520, a digital to analog converter 530, a timing unit 540, a communication unit 550, a memory unit 560, an analog to digital converter 570, a multiplexer 580, and a logic unit 590.

The CPU 510 serves to calculate touch coordinates based on the detected touch signal and may be used to operate the sensing signal processor 300. The CPU 510 may be positioned inside the TDDI or positioned outside the TDDI. The power supply unit 520 generates power used in the sensing signal processor 300 and AC input power of the present invention.

The timing unit 540 generates a clock required to process the detected touch signal. For example, for one ADC 570 to digitize several detected touch signals, the digitalization needs to be completed before a next touch signal is detected, and therefore the digitalization needs to be completed based on a fast clock. In this case, a clock to control a speed of the ADC 570 is generated from the timing unit 540. If the CPU completes the generation of the touch coordinates, the communication unit 550 serves to transmit the touch coordinates to the outside or receive a signal applied from the outside. For example, the touch coordinates will be transmitted to an external host CPU through an I2C.

The memory unit 560 serves to temporarily store the detected touch signal data or store firmware required to operate the CPU. A volatile RAM or a non-volatile ROM like a flash memory is used. The ADC 570 digitizes the detected touch signals, and thus the CPU 510 uses the digitalized signal to calculate the touch coordinates or the ADC 570 transmits the calculated touch coordinates to the external host (not illustrated). The Mux 580 serves to select one of several detected touch signals. For example, one of signals of several touch signal processor 300 is selected by the Mux 580 and is digitalized by the ADC 570. The logic unit 590 performs processing processed by the touch signal processor 300 or the function block 500 and the CPU 510 also performs similar or the same functions.

The exemplary embodiment of the present invention will be described with reference to FIG. 5. In the gate blocks, the gate on voltage (about 15 to 20 V) of the TFT is applied to the gate lines one by one in sequence of G1→G2→G3→G4→G5→G1 and the gate off voltage (about −15 to −20 V) is applied to four gate lines to which the gate on voltage is not applied. All the TFTs connected to the gate lines 240 to which the gate on voltage is applied are in a turned on state. The grayscale voltage is applied to the source drive 400 connected to the source lines 250 in synchronization with the application of the gate on voltage.

For example, if the gate turn on voltage of 20 V is applied to the gate line G1, five lateral TFTs connected to the G1 is in a turned on state and the grayscale voltage input to the source drive 400 is applied to the source lines S1 to S5 through the source drive 400. The grayscale voltage applied to the source lines S1 to S5 is used to display an image in the pixel in the display device and detect the touch signal in synchronization with a rising or falling edge of the AC power source used as a power source voltage of the TDDI to be described below.

FIGS. 6 to 10 illustrate the configuration of the sensing signal processor 300 according to the exemplary embodiment of the present invention and illustrate a method for detecting a touch signal using a pixel or pixels in display devices according to an exemplary embodiment of the present invention. Referring first to FIGS. 6 and 7, the source line 250 is connected to one terminal of the amplifier 310 and the grayscale voltage applied to the source line 250 is applied to the other terminal of the amplifier 310. According to the exemplary embodiment of the present invention, the grayscale voltage fed back through the source line 250 connected to one terminal of the amplifier 310 included in the sensing signal processor 300 is detected. Further, according to the exemplary embodiment of the present invention, the sensing signal processor 300 detects a feedback of precharge voltage applied to the touch detecting apparatus using a plurality of pixels (to be described below).

The amplifier 310 amplifies a difference between an original grayscale voltage (grayscale voltage applied to the source drive) and the grayscale voltage fed back to the source line 250.

When the amplifier 310 amplifies the grayscale voltage and the grayscale voltage fed back after a predetermined time, the grayscale voltage is in the same state as the grayscale voltage applied to the source line 250, that is, there is no change in amplitude of power.

As the amplifier 310, a differential amplifier amplifying two voltage differences may be used but several types of amplifiers may be used.

An analog voltage amplified by the amplifier 310 is digitalized by the ADC 570 as illustrated in FIG. 6 and received in the memory unit 560 of the function block 500 illustrated in FIG. 5. If the touch signal detection for all the pixels is completed and thus the receiving of the ADC data about the touch signal detection of all the pixels is completed in the memory unit 560, when the logic unit 590 of the function block 500 transfers the completion of the touch signal detection to the CPU 510, the CPU 510 may calculate the touch coordinates based on the ADC data received in the memory unit 560.

However, the use of the ADC 570 takes up much volume of TDDI and consumes a large current, and therefore as illustrated in FIG. 7, the output of the amplifier 310 may be used as an input of the comparator 320 that takes up a small area, and thus the comparator 320 determines whether the touch is generated.

The signal obtained by amplifying the difference between the grayscale voltage and the fed back grayscale voltage, that is, the output of the amplifier 310 is input to the comparator 320 of FIG. 7, that is, a reference voltage ref_1 is input to the comparator 320. The comparator 320 may compare the output voltage of the amplifier 310 with a comparison voltage to determine whether the touch is generated. For example, if the amplification voltage generated by the amplifier 310 is larger when the pixel is touched rather than when the pixel is not touched, when the reference voltage ref_1 of the comparator 320 is set to be an intermediate value between the voltage when the touch is generated and the voltage when the touch is not made, the output of the comparator 320 may be output as a high level or a low level depending on whether the touch is generated to determine whether the touch is generated.

The amplitude in the voltage output from the amplifier 310 is changed depending on the state of the object or the alternating amplitude of the AC power source, and therefore the reference voltage needs to have various amplitudes and the TDDI has a means that may change the amplitude of the reference voltage. The amplitude of the reference voltage may be changed by setting a register of the TDDI.

If the touch signals are detected in all the pixels in the display devices, the output of one comparator 320 is generated for each pixel and the output of the comparator 320 is stored in the memory unit 560 of the function block 500. Since the output of the comparator 320 is a binary number having a state of 0 or 1, it is enough to allocate only 2 bits to the memory, such that even when the number of pixels is many, the size of the memory need not be large.

As illustrated in FIG. 7, when the comparator 320 is used, the output of the comparator 320 is a true value and a false value depending on a noise state included in the signal of the amplifier input to the comparator. As the amount of noise included in the output signal of the amplifier is increased, the output frequency of the false value will be increased. As a result, when the touch coordinates are calculated based on the wrong signal, the error of the coordinates occurs. Therefore, to reduce the error, the comparator 320 stores the output of the comparator in the temporary memory twice, three times, or multiple times and various filters to average the output value, determine the output value as the true value if the true value is equal to or more than a predetermined frequency, or the like may be applied to extract the output value of the comparator robust to noise. For this purpose, the present invention includes the memory that may temporarily store the output value of the comparator multiple times.

Meanwhile, in the exemplary embodiment of FIG. 6 or 7, to achieve the object to transfer the grayscale voltage to the display device that is one of the objects of the TDDI, it is important to minimize the time additionally taken to detect the touch. For this purpose, the present invention proposes a method for using a sample & holder (hereinafter, S & H 340) to reduce time taken to detect a touch.

Referring to FIG. 8, the grayscale voltage fed back from the source line 250 may determine whether to be connected to the amplifier 310 through a switch SW 330. Further, the S & H 340 is disposed between the amplifier 310 and the switch 330. The S & H 340 is a repository that stores the voltage fed back from the source line 250 and as the S & H 340, a capacitor is generally used. If the voltage fed back from the source line 250 is captured in the S & H 340, the CPU 510 or the logic unit 590 of the function block 500 turns off the switch SW 330. The source line 250 connected to the sensing signal processor 300 is disconnected from the sensing signal processor 300 by the turn off of the switch 330. Next, the operation of the amplifier 310 or the operation of the comparator 320 that is required to detect the touch signal is independent of a grayscale voltage newly applied to the source line 250, and therefore the processing of detecting the touch signal may be processed simultaneously with the operation of applying the new grayscale voltage to the pixel, thereby saving the time taken to detect the touch signal.

If the touch signal detection is completed, m the CPU 510 or the logic unit 590 turns on the switch 330 again to charge the grayscale voltage newly fed back to the S & H 340. Further, the foregoing process is continuously repeated. In this case, it is preferable to discharge the existing charge before the feedback voltage is of the source line 250 is charged in the S & H 340. The reason is that most of the LCDs use the dot inversion, and therefore if the feedback voltage does not discharge the charge of the S & H 340 when the polarity of the grayscale voltage is changed, a grayscale voltage having m different polarities is applied, and as a result the wrong voltage is applied even to the source line 250, such that the image quality may deteriorate, the time taken to detect the touch signal is longer, or the detected touch signal may also be problematic.

However, in the case of the LCD or the OLED that does not use an inversion technique for an operation of a liquid crystal, it is more preferable not to discharge the charge of the S & H 340 than discharging the charge of the S & H 340 to save the charging time of the S & H 340.

Meanwhile, the S & H 340 installed at the input terminal of the amplifier 310 may also be installed at the output terminal of the amplifier 310. Further, if the switch (not illustrated) is installed between the output terminal of the amplifier 310 and the S & H 340, turning on/off the switch by the intervention of the CPU 510 or the logic unit 590 and detecting the touch signal independent of the touch signal detection and the is operation of the pixel voltage based on the voltage stored in the S & H 340 have the same effect as installing the S & H 340 at the input terminal of the amplifier 310. The S & H 340 may be installed at the input terminal of the amplifier 310 or the S & H 340 may be installed at the output terminal of the amplifier 310.

Referring again to FIG. 6, for each amplifier to use the ADC 570, thousands of ADCs 570 for thousands of pixels are required, and therefore the TDDI may not practically use many ADCs 570. Therefore, the present invention proposes a method for reading signals of a plurality of amplifiers 320 by one ADC 570.

FIG. 11 illustrates the Mux 580 included in the function block 500 and a 8×1 multiplexer selecting one of 8 inputs. Referring the embodiment of the Mux 580 to be described below with reference to FIG. 11, the case in which the signals of 8 amplifiers 310 by one Mux 580 and one ADC 570 may be processed will be described. As such, the present invention may use the Mux 580 to process the signals of the plurality of amplifiers 310 by one ADC 570, thereby minimizing the number of ADC 570 to process the touch signal.

Further, when the signals of the respective amplifiers 310 are processed, the signals of the amplifiers 310 are sequentially processed by a time sharing method using the clock generated from the timing unit 540 of the function block 500. For example, No. 1 to No. 8 are sequentially given to 8 amplifiers 310 and the ADC 570 processes a signal of the No. 1 amplifier 310 and then a signal of the No. 2 amplifier and the rest amplifiers are processed by the same method.

When the amplifiers of FIGS. 6 and 7 are designed in the TDDI, a large area is occupied, and therefore when thousands of amplifiers 310 are embedded in the TDDI in an actual application, the problem in that the size of the TDDI is large may occur. To avoid the problem, the present invention proposes a method that does not use the amplifier 310 in the touch detecting method using a pixel or pixels according to the exemplary embodiment of the present invention. FIG. 9 illustrates the touch signal detection using only the comparator 320 without using the amplifier 310, according to the exemplary embodiment of the present invention.

Referring to FIG. 9, the feedback voltage of the source line 250 after the predetermine time for which the grayscale voltage is applied elapses is applied to the comparator 320 together with a reference voltage REF_GM to be compared with the feedback voltage. (In this case, the feedback voltage may be input to the buffer before being input to the comparator 320 and the output of the buffer may be input to the comparator 320). The comparator 320 is implemented as an OPAMP and the operation principle thereof is known to those skilled in the art, and therefore the detailed description of the operation principle will be omitted.

The feedback voltage of the source line 250 input to the comparator 320 is a feedback voltage of the grayscale voltage applied to the source drive 400. Therefore, the feedback voltage input to the comparator 320 may be changed depending on whether the touch is generated based on the gamma voltage applied to the source drive 400. Therefore, the exemplary embodiment of the present invention proposes a method for generating a reference voltage REF_GM of a comparator 320 using a grayscale voltage generator 5.

The fact in which the output of the source drive 400 is in the Hi-z state when the AC power source is swung to detect the touch signal is already described. Therefore, the grayscale voltage is no longer used at timing when the feedback voltage input to the comparator 320 is validly determined. Therefore, in the exemplary embodiment of FIGS. 9 and 10 using the comparator 320 for is the touch signal detection, the grayscale voltage generator 5 may be used as the reference voltage of the comparator 320.

The grayscale voltage fed back from the source line 250 may have a larger or smaller amplitude than the original grayscale voltage depending on whether the touch is generated. As described below, the polarity of the feedback voltage is changed depending on whether the feedback voltage rises and falls at the time of the touch signal detection in synchronization with the rising and falling edges of the alternating AC power source. Therefore, when the grayscale voltage already applied is fed back, the grayscale voltage as the comparison voltage for comparing with the feedback voltage needs to have a larger or smaller amplitude than before.

To use the grayscale voltage as the reference voltage of the comparator 320, the grayscale voltage is already applied to be compared with the feedback voltage, and therefore an order of the grayscale voltage selected to use the grayscale voltage as the comparison voltage need not be changed. For example, provided that an order of the grayscale voltage applied to a currently any anode is Data_P8 in FIG. 3, even when the amplitude of Vdd, GND, or the like is changed to use is the grayscale voltage as the reference voltage, the order of the Data_P8 needs to be continuously maintained.

First Exemplary Embodiment for Case in which Amplitude of Grayscale Voltage is Changed.

According to the exemplary embodiment for changing the amplitude of the grayscale voltage, when the amplitude of the Data_P8 of FIG. 3 is 3.0 V, to change the amplitude of the Data_P8 to a direction in which it rises to 3.1 V, the amplitude of the Vdd applied to R1 of FIG. 3, that is, the reference voltage Vdd of the grayscale voltage generator 5 needs to be increased. The reference voltage of the grayscale voltage generator 5 is a reference voltage applied to the grayscale voltage generator 5 to make the grayscale voltage. To make the amplitude of the grayscale voltage small, the reference voltage of the grayscale voltage generator 5 needs to be applied low. As such, the exemplary embodiment of the present invention provides a means for changing the amplitude of the reference voltage of the grayscale voltage generator 5 to change the amplitude of the grayscale voltage.

Further, the TDDI has a means for changing the amplitude of the reference voltage of the grayscale voltage generator 5. This can be performed by the is register inside the TDDI.

Second Exemplary Embodiment for Case in which Amplitude of Grayscale Voltage is Changed To change the amplitude of the grayscale voltage, there is a method that the grayscale voltage generator 5 connected to a reference voltage changes an amplitude of resistance generating a first grayscale voltage. In FIG. 3, R1 to R10 are a first resistance string unit 3 and there is a resistance string unit 7 generating a second grayscale voltage. To make the grayscale voltage large, it is enough to reduce the amplitude of the R1 of the first resistance string unit 3. Further, to make the grayscale voltage small, it is enough to make the amplitude of the R1 large.

If the amplitude of the R1 is set to be 10 R based on the unit resistance R applied to the first resistance string unit 3, when the amplitude of the R1 is reduced to 1 R, the voltage of Data_P8 will rise by a voltage division principle. Further, if the amplitude of the R1 is increased to 20 R, the voltage of the Data_P8 will be reduced.

Further, the R1 and the R10 perform the same role on positive and negative grayscale voltages, and therefore if the R1 is reduced, the R10 is also reduced to the same amplitude.

As described above, the exemplary embodiment of the present invention may adjust the amplitude of the grayscale resistance, in more detail, the size of the first grayscale resistance string unit to change the amplitude of the grayscale voltage.

Meanwhile, as described in the exemplary embodiment of FIG. 9, when the grayscale voltage generator 5 is changed to use the grayscale voltage as the reference voltage of the comparator 320, the amplitude of the common voltage need not be changed. The reason is that TFTs other than the TFT in the active state in which the image data (grayscale voltage) is applied to the pixel are in the turned off state and are operating the liquid crystal using a relative potential between the voltage charged in the Cst and the common voltage, and therefore if the common voltage is changed, the abnormality of the image quality may occur.

Therefore, according to the exemplary embodiment of the present invention, even when the grayscale voltage generator 5 as the means for detecting the touch signal is used to change the grayscale voltage, the common voltage is not changed.

FIG. 7 illustrates the example in which one comparator 320 compares the output voltage of the amplifier 310 with the comparison voltage, in which it is possible to determine whether the touch is generated, but the information for determining the contact area or the opposite distance between the touch sensor (pixel) and an object that is main factors forming the touched extent, that is, the touch capacitance is insufficient. For example, when the fingerprint recognition is performed using the pixel, there is a need to know the touched extent in addition to information that a protrusion and a depression of the fingerprint are touched to display the fingerprint. Like this case, there may be a need to confirm the touched extent. As such, the touched extent is the difference between the touch signals changed depending on the contact area or the opposite distance between the touch sensor (pixel) and the objects.

FIG. 10 illustrates the touched extend according to the exemplary embodiment of the present invention. To detect the touched extent, the plurality of comparators 320 are installed at the output of the amplifier and the respective comparator are applied with different comparison voltages ref.

If the voltage output from the amplifier 310 is present between 100 mV and 500 mV depending on the touched extent, a signal difference of 400 mV (500 mV-100 mV) may be divided into 10 numbers by 10 comparators 320 and the reference voltage of the respective comparators 320 is set in a unit of 40 mV to confirm the extent of the touch signal detected by the reference voltage like 140 mV/180 mV.

For example, when a voltage output from the amplifier 310 is 240 mV, the reference voltage of the first comparator 321 starts from 100 mV and thus a reference voltage of a second comparator 322 is 140 mV, a reference voltage of a third comparator 323 is 180 mV, a reference voltage of a fourth comparator 324 is 220 mV, and a reference voltage of a fifth comparator 325 is 260 mV, the outputs of the first comparator 321 to the fourth comparator 324 and the outputs of the rest comparators may have different statuses due to the voltage of 240 mV output from the amplifier 310. The CPU 510 may refer to the statuses to confirm the amplitude of the voltage currently output from the amplifier 310.

Further, according to the exemplary embodiment of the present invention, the TDDI has a means for generating a plurality of reference voltages applied to a group of comparators 320 and a means for changing an amplitude of reference voltage. The amplitude of the reference voltage may be changed by changing the register of the TDDI. Further, it is possible to individually change the amplitude of a plurality of reference voltages.

To install more comparators 320, the voltage detected by the amplifier 310 may be subdivided in more detail, but the area of the TDDI is increased, which is a cause of increasing costs of the TDDI.

To prevent the above problem, the exemplary embodiment of the present invention proposes a method for confirming a touch status of a plurality of amplifiers 310 using one group of comparators 320 and a Mux 580 of a function block 500 that perform the function as illustrated in FIG. 10.

FIG. 11 illustrates an example in which the signals of the plurality of amplifiers 310 are processed by one Mux 580 and one group of comparators 320, according to the exemplary embodiment of the present invention. FIG. 11 illustrates the 8×1 Mux 580 that may select one of 8 input signals, in which the Mux 580 may select one of 8 input signals of the amplifier 310 by the control signal from the CPU 510 of the function block 500 (not illustrated) or the control signal of the logic unit 590.

The LCD of the dot inversion scheme mainly supports the dot inversion of 1/2/4/8/16, or the like. This means that 8 dot inversion is performed on pixels present in the same row connected to the gate of the TFT by one gate line 240, for example, 8 pixels at the same potential. For example, in the 8 dot inversion, first eight dots perform positive inversion, next 8 dots perform negative inversion, and next 8 dots perform positive inversion again. After one frame is completed, the first 8 dots start from the negative inversion.

The amplifier that is applied with the same inversion, that is, the same positive or negative gamma voltage and amplifies it is preferably used in the same Mux 580. The reason is that it is easy to keep the positive or negative polarity of the reference voltage of the comparator 320 same.

Referring to FIG. 11, outputs of 8 amplifiers 310 are used as the input of one Mux 580 and the amplifiers 310 are connected to the source line connected to the pixel allowing 8 amplification functions to identically perform the positive or negative inversion.

Referring back to FIG. 9, the switch 330 and is the S & H 340 may also be installed at the feedback line input to the comparator 320, like FIG. 8.

Further, the switch 330 and the S & H 340 may also be installed at the feedback line input to the amplifier 310 of FIG. 10.

As described above, according to the exemplary embodiment of the present invention, the switch 330 and the S & H 340 are installed at the feedback line connected to the comparator 320 or the amplifier 310 to more rapidly operate the grayscale voltage applied to the pixel.

In the touch detecting apparatus and the touch detecting method using a pixel or pixels according to the exemplary embodiment of the present invention, the method for detecting a touch signal using a pixel or pixels allows the power source voltage applied to the TDDI to apply the alternating AC voltage and detects the touch signal in synchronization with the rising edge or the falling edge of the AC voltage.

FIG. 12 illustrates an example of the alternating AC voltage. Referring to FIG. 12, there is a voltage maintaining an always constant voltage difference based on AGND that is a ground, which is defined as Vci in the present invention.

The AGND that is the alternating ground is swung based on an earth GND but the Vci that is based on the AGND maintains a constant voltage and is defined as the alternating AC voltage or the AC voltage.

For example, the AC voltage is always maintained at 3V based on the AGND and when the AGND is swung, the amplitude of the Vci is increased by the amplitude of the AGND. For example, when the amplitude of the AGND is 10 V, the amplitude of the Vci is 13 V.

When the AC voltage is swung, based on a ground potential that is an absolute potential, a plus voltage may be swung to a minus voltage, a minus voltage may be swung to a plus voltage, the alternating may also be made within the plus voltage, and the alternating may also be made only within the minus voltage.

The touch signal detection using a pixel or pixels according to the exemplary embodiment of the present invention applies the grayscale voltage to the pixel, makes the pixel in the Hi-z state, and then alternates the AC power source and detects the touch signal using the change in voltage generated in the pixel at the time of the rising or falling edge of the AC power source.

The alternating power source is generated inside the TDDI or generated in a power management IC (PMIC) outside the TDDI to be applied to the TDDI. Further, the AC voltage generated in the PMIC is identically applied to all the circuits, such as the ICON and the gate IC in addition to the TDDI, that are used in the touch detecting device using a pixel or pixels according to the exemplary embodiment of the present invention.

FIG. 13 is a timing chart of a touch detecting method using a pixel or pixels according to an exemplary embodiment of the present invention. FIG. 13 will be described below with reference to FIGS. 5 and 12.

Referring to FIG. 13, only the operations of two gate lines G1 and G2 of FIG. 5 are described, but an operation of applying a TFT on voltage to lines from first to end of hundreds of gate lines in sequence is performed in the actual display device. Further, signals are defined for only five source lines S1 to S5 of FIG. 5, but in the actual display device, the number of source lines is expanded to hundreds to thousands.

The AC power source of FIG. 12 is applied as the power source of the TDDI. The typical LDI or TDDI to which the present invention is not applied will be applied with the DC voltage, but in the present invention, the AC power source is used. When a power source such as an input/output (I/O) power source in addition to the power source is additionally required in the TDDI, all the voltage applied to the TDDI commonly uses the AGND and the TDDI is supplied with the AC voltage having amplitude which is relatively determined with respect to the AGND.

The AC power source is applied to the TDDI and thus the voltage required for the TDDI is generated in a power generator.

Referring to FIGS. 5 and 13, first, all the TFTs connected to the G1 is turned on in a section in which the G1 is high and the source drive 400 applies a predetermined grayscale voltage to the source lines S1 to S5. The CPU 510 or the logic unit 590 changes the output of the source drive 400 to the Hi-z when the pixel and the Clc and Cst of the TFT are charged depending on the application of the grayscale voltage of the source drive 400.

A pixel at the moment that the source drive 400 is switched to the Hi-z becomes the Hi-z state like being modeled in FIG. 14. Reference numeral 600 of FIG. 14 represents a comparator, an amplifier, a buffer, or the like and all elements of which the input is in the Hi-z state are used. A resistance 700 of FIG. 14 is a turn on resistance of the TFT and the amplitude thereof is disregarded in the present invention.

Referring back to FIG. 13, the gate is still in the turned on state when the source drive 40 is in the Hi-z state and the Vci that is the alternating AC power source is swung from high to low or from low to high like the AGND. When the Vci that is the power source voltage applied to the TDDI is swung, the voltage detected at the pixel, that is, the voltage detected at the intersecting point between reference numeral 600 of FIG. 14 and the pixel is as the following Equation.

$$Vt = Vgrayscale \pm Vsw \frac{Ct}{Cp + Clc + Cst + Ct} \quad \text{[Equation 1]}$$

In the above Equation 1, Vt represents the detected voltage at the time of the touch detection and Vgrayscale represents a current voltage charged in the liquid crystal capacitor Clc, the storage capacitor Cst, etc., as the grayscale voltage applied by the source m drive 400. Cp is a total sum of parasitic capacitors added to the pixel, such as a parasitic capacitor generated between the lines of the group of the source lines 250 connected to the pixel and a parasitic capacitor generated between a guard layer to be added on is the source line 250 to be described below and the source line 250, etc. The Clc is the liquid crystal capacitor and is currently charged with Vgrayscale and is formed as a relative ground with respect to Vcom. The Cst is the storage capacitor and is formed by setting a previous gate line as the ground and the ground thereof is represented by Cst_GND.

In FIG. 14, the relative amplitude of a potential of point P and the Vcom or the relative amplitude of the potential of the point P and Cst_GND is a constant DC value but the AGND that is the GND of the TDDI is swung, and therefore the Vcom or the Cst_GND is swung like the AGND based on the absolute potential that is the ground potential.

Referring to the above [Equation 1], when the touch is not made, Ct is not formed, and therefore the voltage applied to the pixel is the same as the originally applied grayscale voltage, such that an image can be displayed on the display device without the abnormality of the image quality. However, when the touch is generated between a pixel and an object like a finger, the difference in the grayscale voltage applied to the pixel occurs and as described above, the sensing signal processor 300 may use the amplifier 310 or the comparator 320 to detect the voltage, thereby determining whether the touch is generated.

Referring back to FIGS. 6 and 7, when the differential amplifier is used as the configuration of the amplifier 310, it is described that one of the voltages used in the amplifier 310 is the grayscale voltage and the other thereof is the feedback voltage. The output voltage of the differential amplifier amplifies the difference between the two input voltages and is represented as the following [Equation 2].

$$V\text{diff} = \text{Gain}(V1-V2) \qquad \text{[Equation 2]}$$

In the above Equation 2, Vdiff represents the output voltage of the differential amplifier, Gain represents an amplification amount of the signal set in the differential amplifier, V1 represents a voltage connected to a positive input of the differential amplifier, and V2 represents a voltage connected to a negative input.

Provided that the current grayscale voltage is defined as "Vgrayscale" and Gain=1, the above [Equation 2] may be defined as the following [Equation 3].

$$\begin{aligned} V\text{diff} &= V\text{gayscale} - \left( V\text{grayscale} \pm \frac{Ct}{Cp + Clc + Cst + ct} \right) \qquad \text{[Equation 3]} \\ &= \mp \frac{Ct}{Cp + Clc + Cst + Ct} \end{aligned}$$

Referring to the above [Equation 3], the differential amplifier may confirm the difference due to the addition of Ct that is the touch capacitance, by using the foregoing method using the differential amplifier.

Referring back to FIG. 13, Vci is swung, and then the voltage detected based on the above [Equation 2] or [Equation 3] is processed by the ADC 570 or the comparator 320 to be stored in the memory unit 560 and the CPU 510 or the logic unit 590 may control the processes. Further, the CPU 510 calculates the touch coordinates based on the signal stored in the memory unit 560 and transfers the calculated touch coordinates to the external host CPU through the communication unit 550.

Further, referring to FIGS. 12 and 13, to alternate the AC input voltage from high to low or from low to high, the AC input voltage needs to reach the high or low state in advance before the alternating signal is output. Referring to FIG. 13, the signal processing is is made before the Vci is swung, which is not illustrated in FIG. 13.

The Ct that is the touch capacitance is determined by the following [Equation 4].

$$Ct = e\frac{d}{s} \qquad \text{[Equation 4]}$$

In the above Equation 4, e represents permittivity, d represents a distance between the pixel and the object, and s represents a contact area between the pixel and the object. The area of the pixel forms a size from at least 100 µm2 to hundreds of µm2 and the area of the objects such as a finger and a touch pen is larger than the area of the pixel, and therefore S may be considered to be the overall area of the pixel.

When the area of the pixel is small, the touch capacitance formed by the above [Equation 4] is much smaller than the touch capacitance distributed in a denominator of the above [Equation 1] or [Equation 3], and therefore it is difficult to detect the touch signal. To solve the above problem, the exemplary embodiment of the present invention proposes a method for collecting several pixels to generate a touch.

FIG. 15 illustrates a method for forming one touch capacitance by operating a plurality of pixels like one pixel according to an exemplary embodiment of the present invention and FIG. 16 is a timing chart of the operation of FIG. 15. Referring to FIGS. 15 and 16, a circuit element and a circuit operation specialized in the present invention are as follows.

It is determined whether source lines S1 to Sm are connected to the sensing signal processor depending on a high or low state of a "sensor block control signal' that is the control signal of the CPU 510 or the logic unit 590. According to the exemplary embodiment of the present invention, if 0V that the state of the sensor block control line is the ground potential (AGND) is low and 5V, 10V, etc., is high, a line connection switch is turned on in the state in which the sensor block control line is in the high (H) state to connect the source line to the sensing signal processor 300.

If the sensor block control signals Bi to Bl are high, four source lines from S1 to S4 are connected to each other by one sensing signal processor 300. Further, referring to FIG. 16 that is the timing chart, the gate lines G1 to G4 are simultaneously high, and thus is all the TFTs connected to the longitudinal gate lines G1 to G4 are turned on, such that all 16 TFTs connected to the source lines S1 to S4 among all TFTs connected to G1 to G4 are simultaneously turned on to be connected to the sensing signal processor 300, which creates the result that 16 pixels are operated like one pixel. As a result, the pixel detecting the touch signal is widened and the touch capacitance derived from the above [Equation 4] is large, thereby facilitating the touch signal detection.

Referring back to FIGS. 15 and 16, if the G1 to G4 are turned on and the sensor block control signal is high to make all of the line connection switches be in an on state, all 16 pixels included in (S1 to S4, G1 to G4), (S5 to S8, G1 to G4), (S9 to S12, G1 to G4), . . . , (Sm−3 to Sm, G1 to G4) are connected to each other. (The meaning of (S1 to S4, G1 to G4) means that G1 to G4 are simultaneously turned on and S1 to S4 are formed as one group).

Setting S1 to S4 as one group is merely to describe the exemplary embodiment of the present invention, but actually the smaller or larger number of pixels may be set as one group. Further, simultaneously turning on the G1 to G4 is merely to describe the exemplary embodiment of the present invention, but actually the smaller or more number of gate lines may be simultaneously turned on.

The line connection switch is formed inside the TDDI. Therefore, an added circuit or a process change is not generated in the display device. Further, m the S & H 340 may be installed between the line connection switch and the sensing signal processor 300.

Further, the sensor block control line that is a line controlling the line connection switch is present inside the TDDI, which is repeatedly turned on/off by the CPU 510 or the logic unit 590 of the function block 500. The sensor block control lines may be repeatedly turned on/off sequentially or randomly. However, it is more preferable to simultaneously perform the turn on and off to reduce the touch detecting time.

The touch detecting method using several pixels according to the exemplary embodiment of the present invention will be described below with reference to FIG. 16.

Region 1 of FIG. 16 is a process of detecting a touch with a plurality of pixels before region 2 displaying an image by applying the grayscale voltage to the pixel. The detailed operation timing is as follows.

1. Step of Simultaneously Applying the Turn on Voltage of the Plurality of Gate TFTs According to the exemplary embodiment of the present invention, the turn on voltage of the TFT is applied to the four gate lines G1 to G4 but actually, the turn on voltage of the TFT may be simultaneously applied to 2 to 10 gate lines.

To display an image, the turn on voltage of the TFT needs to be applied to only one gate line in the display device but according to the exemplary embodiment of the present invention, the turn on voltage of the TFT is applied to the plurality of gate lines.

To simultaneously turn on the plurality of TFT lines, the ICON applies the clock or the control signal to the gate drive IC or the GIP block. In the GIP, one gate line 240 is selected by a combination of the plurality of clocks and therefore the plurality of clocks are changed or a new clock is added to select the plurality of gate lines.

Further, the gate drive IC also selects the gate line in the decoder by the combination of the plurality of clocks, and therefore the plurality of clocks are changed or the new clock is added to select the plurality of gate lines.

2. Step of Applying a Voltage (Precharge Voltage) to Pixels Connected to the Plurality of Turned on Gate Lines and Capacitors Connected to the Pixels in the Above 1 by Using the Source Line 1) When the pixel is applied with a voltage and then the source drive 400 is applied with the Hi-z and alternating power source, the touch signal is detected in synchronization with the alternating edge of the alternating voltage. In this case, the voltage applied to the pixel is a voltage independent of the image quality, and therefore is called the precharge voltage.

The touch signal detection is preferable to be performed after the predetermined time waits after the alternating rising or falling signal. The reason is that the signal delay due to the turn on resistance Ron of the TFT and the Cp illustrated in FIG. 14 occur, and therefore the predetermined time is required to feedback the change in voltage generated from the pixel through the source line 250. In this case, the delay time is preferably set to be 0.5 μs to 1 ms.

2) The voltage applied to the pixel is independent of the image to be displayed by the pixel, and therefore any voltage may be applied as the precharge is voltage (region of FIG. 16 is an out region from S1 to Sm of 1/3/100). In this case, the difference in the precharge voltage fed back from the amplifier is amplified based on the applied precharge voltage.

The TDDI of the present invention has a means for generating any precharge voltage applied to a pixel at the time of the touch detection. Further, it has the means for changing the amplitude of any precharge voltage generated. The register is set inside the TDDI and it is possible to change the amplitude of any precharge voltage depending on the change of the register.

3) The voltage applied to the pixel is independent of the image to be displayed by the pixel but generating any precharge voltage of the above 1) and operating it make the power supply unit complicated and the area of the TDDI large, which is not preferable. The present invention may use any grayscale voltage generated from the grayscale voltage generator 5 as the precharge voltage.

4) When the plurality of pixels are applied with the precharge voltage and then the power source is swung (or after the source drive is in the Hi-z state) to detect the touch signal, the sensor block control line is in the high (H) state and thus the pixel voltages may be connected to each other (region 1 of FIG. 16).

5) When the plurality of pixels are applied with the precharge voltage to detect the touch signal, the sensor block control line is in the high (H) state and thus the pixel voltages may be connected to each other (region 3 of FIG. 16).

3. Step of Detecting the Touch Signal

1) If the predetermined time elapses after a pixel or pixels are applied with the precharge voltage (out region from S1 to Sm of region 1/3/100 of FIG. 16) and thus the Cp, the Clc, the Cst, or the Ct connected to the pixel or the pixels is charged, the CPU 510 or the logic unit 590 changes the source drive 400 to the Hi-z state. (region 1/3/100 of FIG. 16).

2) It is possible to connect the plurality of pixels to each other by changing the sensor block control signal to the high state while applying the precharge voltage to a pixel or pixels (region 3 of FIG. 16).

3) When the precharge voltage is applied to a pixel or pixels and then the source drive 400 is in the Hi-z state, it is possible to connect the plurality of pixels to each other by changing the sensor block control signals Bi to Bl to the high state (region 1, region 100 of FIG. 16).

4) It is possible to turn on the sensor block control signals Bi to Bl at the intermediate time of the above 2) or 3) anywhere.

5) The source drive applies the AC input voltage Vci that is the alternating power source after it becomes the Hi-z. This is the region in which the Vci of region 1/3/100 of FIG. 16 is swung.

6) The alternating power source in the above 5) is swung from low to high or from high to low. The low means a lower state than high.

7) If the touch is generated between objects and pixels to generate the touch capacitance, the change in voltage depending on the above Equation 2 that is generated from the plurality of interconnected pixels is generated in the sensing signal processor 300, which is detected by the amplifier 310 or the comparator 320 in the sensing signal processor 300.

4. Step of Forming an Image in a Pixel or Pixels Used for the Touch Detection

The original purpose of the pixel is to display the image but the pixel is applied with the precharge voltage to detect the touch before the image is displayed, and therefore the image of the pixel is not the wanted image. Therefore, after the touch detection is completed in a plurality of pixels, the image data needs to be applied to each pixel.

1) Changing Interconnected Pixels to Individual Pixel (1) Individually applying the turn on voltage of the TFT to the gate line 240: Only one gate line 240 needs to maintain the TFT on state to change the plurality of interconnected pixels to the individual pixel. Region 2/4/101 displays applying the high voltage that makes each of the gate lines the TFT on state. For gates Nos. 101 to 104 to perform the touch detection, if the turn on voltage of the TFT is simultaneously applied and then the touch detection is completed, the gate No. 101 is applied with the turn on voltage of the TFT and the rest gates are applied with the turn off voltage of the TFT.

(2) Individually separating the interconnected source lines 250: To change the plurality of interconnected pixels to the individual pixel, the low voltage is applied to the sensor block control lines Bi to Bl to change all the line connection switches in the turn on state to the turn off state (high voltage may also be applied). Therefore, the source line 250 is individually separated.

2) Transferring the Image Data to the Pixel

All the pixels are not connected to each other through the process but independently separated, and therefore sequentially apply the TFT on voltage to the gate lines 240 to apply the grayscale voltage, thereby displaying an image on the pixel. This is a region of region 2/4/101 of FIG. 16 and the gate turn on voltage of the TFT is applied to only one gate line 240 in the display device when the image is displayed in the pixel.

5. Step of Calculating the Touch Signal

The change in voltage depending on the above [Equation 2] by the touch capacitance Ct formed between the plurality of pixels and the objects is detected by the amplifier 310 or the comparator 320 of the sensing signal processor 300 and is transferred to the memory unit 560. The CPU 510 analyzes the data of the memory to determine whether the touch is generated. This is made in the region (region 2/4/101 of FIG. 16) in which the touch detection is completed and the image is displayed in the pixel. Alternatively, the touch detection and the touch signal calculation may be is simultaneously made in the region (region 1/3/100 of FIG. 16) in which the touch detection is performed. Alternatively, after the image transfer to the pixel is completed, the CPU may analyze the touch signal stored in the memory in a frame rest period (a vertical front poach and back poach, region 102 of FIG. 16) to calculate the touch coordinates.

As such, the present invention may be used for the touch signal detection using a pixel or pixels in the display devices and the display devices.

If the touch is not generated, determining whether the touch is generated rather than extracting the precise touch coordinates needs to be preceded, and therefore all the processes about the touch signal detection and the image display as described above to determine whether the touch is generated are not necessarily progressed. For example, only the region in which the touch detection may be partially made moves to the touch detection mode (region 1/3/101 of FIG. 16) to determine whether the touch is generated and if the touch is detected, then it is effective that the region enters a normal touch detection mode.

As a result, provided that the number of the pixels connected to each other is 100 for the normal touch detection, when some of the connections, that is, only 50 or 25 connections are operated to detect the touch, the touch detecting time may be saved to generate the time for displaying the image of the pixel and the power consumption may be reduced.

For example, provided that the pixel block formed of four gate lines and four source lines are present, the case in which the pixel block is in the active state for the touch detection is 1, and the case in which the touch detection is not made is 0, the state of the touch detection using a pixel or pixels in the normal case may be shown as follows.

| | | | | | | | | | |
|---|---|---|---|---|---|---|---|---|---|
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |

It is shown that the number of pixel blocks formed of 16 unit pixels is 10 in a horizontal direction and 4 in a vertical direction, that is, 40 pixel blocks for touch detection are present. In the step of detecting only whether the touch is generated, the 40 pixel blocks may be shown as follows.

| | | | | | | | | | |
|---|---|---|---|---|---|---|---|---|---|
| 1 | 1 | 1 | 1 | 1 | 1 | 1 | 1 | 1 | 1 |
| 0 | 0 | 0 | 0 | 0 | 0 | 0 | 0 | 0 | 0 |
| 1 | 1 | 1 | 1 | 1 | 1 | 1 | 1 | 1 | 1 |
| 0 | 0 | 0 | 0 | 0 | 0 | 0 | 0 | 0 | 0 |

If one line is sensed and one line is not sensed by the combination, the sensing time is reduced to a half. Alternatively, various methods such as a method for sensing one line and not sensing two lines may be provided.

The S & H 340 may be connected to the sensing signal processor 300 of FIG. 15 and the detailed operation principle is as described above.

Referring back to FIG. 16, in the display device that normally displays only the pixel, the gate lines 240 G1 to Gm are sequentially applied voltage changing from low to high. That is, region 4 is continued from the region 2 of FIG. 16 and finally, displaying an image on the display device ends in the region 101.

The TCON provides timing suitable for the image signal to the LDI but in the ICON of the present invention, the signal detecting the touch signal prior to transmitting the image signal as illustrated in FIG. 16 needs to be first transmitted to the TDDI of the present invention.

If the ICON may not transmit the signal, the image signal is received from the ICON and is received in the memory of the TDDI and then the TDDI itself combines the touch detection signal and the image signal to perform the process depending on the timing chart as illustrated in FIG. 16.

Referring back to FIG. 1, the size of the source line 205 or the gate line 240 is slightly exaggerated but considering the display device including a source line or a gate line generally having a line width of around 6 μm to 10 μm and a pixel having a width of around 30 μm, an effect of the touch malfunction may appear like as if the pixel is touched even when the source line 250 is touched by an object like a finger.

FIG. 17 illustrates a method for preventing a touch detection of a source line 250 according to an exemplary embodiment of the present invention.

FIG. 17 is a cross-sectional view of the structure of the TFT of FIGS. 4 and 5. Referring to FIG. 17, a guard layer 295 is disposed on the source line 250. The guard layer 295 is made of metallic materials such as copper, aluminum, carbon nano tube (CNT), and metal mesh or transparent conductive materials such as ITO and IZO.

The guard layer 295 is disposed on the source line 250 to be connected to the power source at one side of the display device. As the power source voltage connected to the guard layer 295, there is the power source voltage supplied to the TDDI, that is, the power source voltage supplied from the power management IC (PMIC) supplying the alternating AC power source. The power source includes the AGND. The power source forms the DC with respect to the AGND but is the alternating voltage based on the ground power source.

Further, the guard layer 295 may also be connected to the power source supplied by the TDDI. For example, when the power source of 5V supplied from the TDDI is connected, the power source has DC of 5V based on the AGND but is the alternating voltage based on the ground potential that is the absolute potential.

A passivation layer 280 is disposed between the guard layer 295 and the source line 250 and the source line 250 and the guard layer 295 are not shorted due to the passivation layer 280.

If the guard layer 295 is installed, the source line 250 is under the guard layer 295, and therefore the source line 250 may not form the touch capacitance with the object such as an external finger, thereby solving the error that the source line 250 recognizes the touch.

Further, the guard layer 295 may be disposed in a BM region under the color filter substrate 100 of FIG. 1. As described above, to perform the present invention, a TN type LCD may not detect the touch using a pixel or pixels since the common electrode 120 on the color filter substrate 100 suppresses the capacitance from being formed between the pixel and the object. However, if the TN type LCD rotates 180° to position the TFT substrate at the top, the touch capacitance is formed between the pixel and the object to perform the touch detection using a pixel or pixels.

Referring back to FIG. 1, in the LCD of an IPS or FFS type that is the in plane switching mode in which the common electrode 120 is not disposed on the color filter substrate 100, the black matrix (BM) of the color filter substrate serves to prevent a light leakage between pixels (RGB) of the color filter or shield the source line 250 or the gate line 240 of the TFT substrate 200. Therefore, the foregoing guard layer 295 is disposed under the color filter substrate 100 but it is enough to dispose the guard layer 295 in the BM 130 opposite to the source line 250 to face the source line 250 and apply the same voltage as the foregoing embodiment for the guard layer 295.

In this case, the guard layers 295 are connected to each other through the horizontal BM 130 or connected to each other at the outside of the active area of the display device, such that the guard layers 295 are conducted to each other.

According to the exemplary embodiment of the present invention in which the guard layer 295 is disposed under the color filter substrate 100 in the longitudinal direction, the power source connected to the guard layer 295 is supplied from the TFT substrate 220 and when the color filter and the TFT substrate are connected to each other with a seal, the power source for the guard layer supplied from the TFT substrate 200 is transferred to the guard layer 295 of the color filter substrate 100 by a conductive spacer mixed in the seal and is connected thereto.

According to another exemplary embodiment of the present invention for protecting the source line 250 from the touch, the guard layer 295 under the foregoing color filter 110 is disposed over the color filter substrate 100. Even in this case, the guard layer 295 is formed on the longitudinal BM 130 of the color filter and the guard layers 295 are connected to each other in a mesh structure to be conducted to each other and then the voltage for the foregoing guard layer is applied from one side of the upper surface of the color filter 110. At the time of the application of the voltage, the voltage sourced from the PMIC or the TDDI using flexible circuit boards such as FPC and COF is applied.

In the case of the TN type LCD, the touch may not be detected due to the common electrode 120 disposed on the color filter. In this case, the touch signal detection using a pixel or pixels can be made by the structure in which the LCD rotates 180° to position the TFT substrate 200 at the top and position the color filter substrate 100 at the bottom and a back light unit (BLU) is irradiated from the color filter.

FIG. 18 illustrates the case in which the TN is overturned, in which according to the exemplary embodiment of the present invention for preventing the touch detection by the source line 250, the guard layer 295 is disposed under the source line 250. Further, the passivation layer between the source line 250 and the guard layer 295 serves to insulate between the two objects.

In this case, one mask forms the guard layer 295 and another mask etches and exposes the passivation layer 280 covering the guard layer 295 and connects the power supply for the foregoing guard layer. Alternatively, one mask patterns the guard layer 295 and the passivation layer 280 of the upper surface thereof is patterned using the mask used in the LCD process and one side of the guard layer 295 is exposed and then the power source for the foregoing guard layer may be connected to the exposed portion. In this case, only a sheet of mask in addition to the mask used for the normal process of the LCD is added and therefore the guard layer 295 may be formed economically.

In FIG. 19, the pixel partitioned by the source line 250 and the gate line 240 is illustrated and the guard layer 295 added to the upper surface or the lower surface of the source line 250 connected to the pixel is illustrated thickly. Further, FIG. 19 illustrates the guard layer 295 that is formed on the upper surface or the lower surface of the color filter and serves to cover the source line 250.

As such, according to the exemplary embodiment of the present invention, the guard layer 295 is disposed on the upper surface or the lower surface of the source line 250 in the TFT substrate 200 or the guard layer 295 is disposed over or under the color filter substrate 100 to serve to prevent the touch from being generated between the source line 250 and the object.

According to the touch detecting apparatus and the touch detecting method using a pixel or pixels in display devices in accordance with the exemplary embodiments of the present invention, it is possible to simplify the manufacturing, save the manufacturing costs, perform the fingerprint recognition, and additional functions such as writing letters with a passive pen by detecting the touch signal using a pixel or pixels in display devices manufactured by the process facilities manufacturing the display devices.

Hereinabove, the embodiments of the present invention are described but the technical idea of the present invention is not limited to the foregoing embodiments and may be variously implemented without departing from the scope of the present invention.

What is claimed is:

1. A touch detecting apparatus using a pixel or pixels in display devices, the apparatus comprising:
   a grayscale voltage generator configured to generate a first grayscale voltage applied to the pixel or the pixels in the display devices; and
   a sensing signal processor configured to detect a touch signal based on the first grayscale voltage applied to the pixel or the pixels and a second grayscale voltage fed back based on a touch capacitance formed between the pixel or the pixels and a touch input means,
   wherein the touch capacitance is generated between the touch input means and the pixel or the pixels without being intervened by a common electrode of the display devices as the touch input means approaches the pixel or the pixels.

2. The touch detecting apparatus of claim 1, wherein the sensing signal processor calculates a difference value between the first grayscale voltage and the second grayscale voltage to detect the touch signal.

3. The touch detecting apparatus of claim 1, wherein the sensing signal processor includes a differential amplifier that calculates and amplifies a difference value between the first grayscale voltage and the second grayscale voltage.

4. The touch detecting apparatus of claim 3, wherein an input terminal of the differential amplifier is provided with a circuit element temporarily storing the second grayscale voltage.

5. The touch detecting apparatus of claim 1, wherein the sensing signal processor calculates a difference value between the first grayscale voltage and the second grayscale voltage and compares the difference value with a preset reference value to detect the touch signal.

6. The touch detecting apparatus of claim 1, wherein the sensing signal processor includes:
a differential amplifier configured to calculate and amplify a difference value between the first grayscale voltage and the second grayscale voltage; and
a comparator configured to compare the difference value with a preset reference value.

7. The touch detecting apparatus of claim 6, wherein an input terminal of the differential amplifier is provided with a circuit element temporarily storing the second grayscale voltage, or
an input terminal of the comparator is provided with a circuit element temporarily storing the difference value.

8. The touch detecting apparatus of claim 1, wherein the sensing signal processor includes:
a differential amplifier configured to calculate and amplifying a difference value between the first grayscale voltage and the second grayscale voltage; and
a plurality of comparators configured to compare the difference value with a plurality of preset reference values.

9. The touch detecting apparatus of claim 1, wherein the sensing signal processor includes:
a plurality of differential amplifiers configured to calculate and amplify a difference value between the first grayscale voltage and the second grayscale voltage;
a mux configured to select one of a plurality of difference values output through the plurality of differential amplifiers; and
a plurality of comparators configured to compare the selected one difference value with a plurality of preset reference values.

10. The touch detecting apparatus of claim 1, further comprising:
a CPU configured to perform a fingerprint recognition operation based on the detected touch signal.

11. The touch detecting apparatus of claim 1, further comprising:
a CPU or a logic configured to group at least two pixels present on the display devices and simultaneously control them to increase the touch capacitance of the touch signal.

12. A touch detecting method using a pixel or pixels in display devices, the method comprising:
generating a first grayscale voltage applied to the pixel or the pixels in the display devices; and
detecting a touch signal based on the first grayscale voltage applied to the pixel or the pixels and a second grayscale voltage fed back based on a touch capacitance formed between the pixel or the pixels and a touch input means,
wherein the touch capacitance is generated between the touch input means and the pixel or the pixels without being intervened by a common electrode of the display devices as the touch input means approaches the pixel or the pixels.

13. The touch detecting method of claim 12, wherein in the detecting, a difference value between the first grayscale voltage and the second grayscale voltage is calculated to detect the touch signal.

14. The touch detecting method of claim 12, wherein the detecting includes calculating and amplifying, by a differential amplifier, a difference value between the first grayscale voltage and the second grayscale voltage.

15. The touch detecting method of claim 14, wherein an input terminal of the differential amplifier is provided with a circuit element temporarily storing the second grayscale voltage.

16. The touch detecting method of claim 12, wherein in the detecting, a difference value between the first grayscale voltage and the second grayscale voltage is calculated and the difference value is compared with a preset reference value to detect the touch signal.

17. The touch detecting method of claim 12, wherein the detecting includes:
calculating and amplifying, by a differential amplifier, a difference value between the first grayscale voltage and the second grayscale voltage; and
comparing, by a comparator, the difference value with a preset reference value.

18. The touch detecting method of claim 17, wherein an input terminal of the differential amplifier is provided with a circuit element temporarily storing the second grayscale voltage, or
an input terminal of the comparator is provided with a circuit element temporarily storing the difference value.

19. The touch detecting method of claim 12, wherein the detecting includes:
calculating and amplifying, by a differential amplifier, a difference value between the first grayscale voltage and the second grayscale voltage; and
comparing, by a plurality of comparators, the difference value with a plurality of preset reference values.

20. The touch detecting method of claim 12, wherein the detecting includes:
calculating and amplifying, by a plurality of differential amplifiers, a difference value between the first grayscale voltage and the second grayscale voltage;
selecting, by one mux, one of a plurality of difference values output through the plurality of differential amplifiers, and
comparing, by a plurality of comparators, the selected one difference value with a plurality of preset reference values.

21. The touch detecting method of claim 12, further comprising:
recognizing, by a CPU, a fingerprint based on the detected touch signal.

22. The touch detecting method of claim 12, further comprising:
grouping, by a CPU or a logic, at least two pixels present on the display devices and simultaneously controlling them to increase the touch capacitance of the touch signal.

* * * * *